(12) United States Patent
Kagawa et al.

(10) Patent No.: US 6,185,492 B1
(45) Date of Patent: Feb. 6, 2001

(54) VEHICLE STEERING CONTROL APPARATUS FOR ASSISTING A STEERING EFFORT TO MOVE A VEHICLE ALONG A LINE DESIRED BY A DRIVER

(75) Inventors: Kazunori Kagawa, Odawara; Takeshi Goto, Toyota; Kunihito Satoh, Mishima, all of (JP)

(73) Assignee: Toyota Jidosha Kabushiki Kaisha, Aichi-ken (JP)

(*) Notice: Under 35 U.S.C. 154(b), the term of this patent shall be extended for 0 days.

(21) Appl. No.: 09/106,111

(22) Filed: Jun. 29, 1998

(30) Foreign Application Priority Data

Jul. 9, 1997 (JP) .................................................. 9-183956
Sep. 22, 1997 (JP) .................................................. 9-257060
Oct. 2, 1997 (JP) .................................................. 9-270173

(51) Int. Cl.$^7$ ........................................................ B62D 6/00
(52) U.S. Cl. ................................ 701/41; 701/28; 348/118
(58) Field of Search ............................ 701/23, 28, 41, 701/42, 117; 180/167, 168, 169, 408, 410, 411; 348/118, 119

(56) References Cited

U.S. PATENT DOCUMENTS

| | | | |
|---|---|---|---|
| 5,245,422 | * 9/1993 | Borcherts et al. | 348/119 |
| 5,483,453 | * 1/1996 | Uemura et al. | 701/23 |
| 5,517,412 | * 5/1996 | Unoura | 701/23 |
| 5,610,816 | * 3/1997 | Kim | 701/24 |
| 5,765,116 | * 6/1998 | Wilson-Jones et al. | 701/41 |
| 5,913,375 | * 6/1999 | Nishikawa | 180/168 |
| 5,938,707 | * 8/1999 | Uehara | 701/41 |
| 6,053,270 | * 4/2000 | Nishikawa et al. | 180/168 |

FOREIGN PATENT DOCUMENTS

| | | |
|---|---|---|
| 40 14 365 | 11/1990 | (DE) . |
| 43 32 836 | 9/1994 | (DE) . |
| 4-293109 | 10/1992 | (JP) . |
| 5-297939 | 11/1993 | (JP) . |
| 6-255514 | 9/1994 | (JP) . |
| 7-104850 | 4/1995 | (JP) . |
| 7-105498 | 4/1995 | (JP) . |

* cited by examiner

Primary Examiner—Gary Chin
(74) Attorney, Agent, or Firm—Finnegan, Henderson, Farabow, Garrett & Dunner, L.L.P.

(57) ABSTRACT

A vehicle steering control apparatus which controls a steering torque to move the vehicle toward a line desired by a driver or appropriate for circumstances of the vehicle. The vehicle steering control apparatus recognizes a lane on which a vehicle is moving, and controls a steering torque of the vehicle so that the vehicle moves along the lane. A plurality of reference lines, which extend along the lane and are arranged parallel to each other in a direction of a width of the lane, are set. A target moving line is selected from among the plurality of reference lines in accordance with a state of movement of the vehicle. A steering torque is generated for shifting a moving line of the vehicle toward the target moving line.

5 Claims, 28 Drawing Sheets

VEHICLE STEERING CONTROL APPARATUS FOR ASSISTING A STEERING EFFORT TO MOVE A VEHICLE ALONG A LINE DESIRED BY A DRIVER

BACKGROUND OF THE INVENTION

1. Field of the Invention

The present invention relates to a vehicle steering control apparatus and, more particularly, to a vehicle steering control apparatus which assists a steering effort so that a moving line of the vehicle matches a target moving line.

2. Description of the Related Art

Conventionally, as disclosed in Japanese Laid-Open Patent Application No. 7-104856, an apparatus for generating a steering force, when an actual moving line of a vehicle deviates from a previously determined moving line (hereinafter referred to as a predetermined line), so that the vehicle is moved in a direction in which the actual moving line is shifted closer to the predetermined line. The above-mentioned conventional apparatus has a mechanism for detecting a range of a lane on which the vehicle is moving and a mechanism for detecting a range of area in which the vehicle is moving in the lane. Additionally, the above-mentioned apparatus has a mechanism for generating a steering torque so as to return the vehicle to a middle of the lane when the vehicle is shifted toward a side of the lane. Hereinafter, this steering torque is referred to as a returning steering torque.

According to the above-mentioned apparatus, when the moving line of the vehicle deviates from the predetermined line, such a situation can be conveyed to a driver of the vehicle by generating a returning steering torque. Additionally, the driver of the vehicle provided with the above-mentioned conventional apparatus can easily return the vehicle to the predetermined line by being assisted by the returning steering torque. Thus, according to the above-mentioned conventional apparatus, the vehicle can be easily and safely maintained to move on the predetermined line Generally, a moving line which provides a comfortable feel to a driver differs from driver to driver. However, in the above-mentioned conventional apparatus, a fixed line is always set without consideration of such difference among individuals. In the above-mentioned conventional apparatus, the returning steering torque may act to resist a steering effort by the driver when a moving line desired by the driver does not match the predetermined line. In this respect, the above-mentioned conventional apparatus is not always optimum in assisting a steering effort by a driver.

Additionally, the above-mentioned conventional apparatus can alert the driver by automatically generating a returning steering torque when the vehicle is shifted to a side of the-lane on which the vehicle is moving due to some reasons. Thus, according to the above-mentioned conventional apparatus, the vehicle is prevented from deviating from the lane in which the vehicle should be maintained. However, there may be an obstacle such as a motorcycle on the lane. In such a case, the vehicle must move a side of the lane so as to avoid the obstacle. However, the above-mentioned conventional apparatus generates a returning steering torque so as to return the vehicle to the middle of the lane. Accordingly, the driver of the vehicle is required to make a steering effort to resist the returning steering force when an attempt is made to move along a side of the lane so as to avoid an obstacle. Thus, the above-mentioned conventional apparatus may provide a difficulty in maintaining movement of a vehicle along a side of a lane when the vehicle must move the side of the lane so as to avoid an obstacle.

As mentioned above, the conventional apparatus has a problem in that a driver cannot control a vehicle to move a desired line within a lane in which the vehicle is moving since the conventional apparatus always generates a steering torque to maintain the vehicle on a fixed line or always generates a steering torque proportional to a distance between the fixed line and the vehicle.

SUMMARY OF THE INVENTION

It is a general object of the present invention to provide a vehicle steering control apparatus in which the above-mentioned problems are eliminated.

A more specific object of the present invention is to provide a vehicle steering control apparatus which controls a steering torque to move the vehicle toward a line desired by a driver or appropriate for circumstances of the vehicle.

Another object of the present invention is to provide a vehicle steering control apparatus which controls a steering torque to provide a good steering characteristic vehicle when a driver attempts to move the vehicle on a side of a lane on which the vehicle is moving while preventing the vehicle from deviating from the lane.

In order to achieve the above-mentioned objects, there is provided according to one aspect of the present invention a vehicle steering control apparatus recognizing a lane on which a vehicle is moving and controlling a steering torque of the vehicle so that the vehicle moves along the lane, the vehicle steering control apparatus comprising:

reference line setting means for setting a plurality of reference lines which extend along the lane and are arranged parallel to each other in a direction of a width of the lane;

target moving line selecting means for selecting a target moving line from among the plurality of reference lines in accordance with a state of movement of the vehicle; and returning steering torque generating means for generating a steering torque for shifting a moving line of the vehicle toward the target moving line.

According to the present invention, the steering torque is controlled so that the moving line of the vehicle matches the target moving line. The target moving line is determined to be one of the plurality of reference lines set on the lane, which target moving line is optimum for a state of movement of the vehicle. Accordingly, in the present invention, the steering torque is controlled so that the vehicle moves on the moving line most appropriate for the state of movement of the vehicle.

In the above-mentioned invention, the target moving line selecting means may select one of the reference lines which approximates a steering operation line achieved by a steering effort performed by a driver of the vehicle as the target moving line.

Accordingly, the target line is determined to be one of the reference lines which approximates the steering operation line, that is, a line on which the driver attempts to move the vehicle.

Additionally, the vehicle steering control apparatus according to the present invention may further comprise:

deviation preventing area setting means for setting a deviation preventing area on a side of the lane; and deviation preventing torque generating means for generating a steering torque for moving the vehicle toward a middle of the lane when the moving line of the vehicle overlaps with the deviation preventing area.

According to the above-mentioned invention, if the moving line of the vehicle is shifted to a side of the lane, the moving line may overlap the deviation preventing area. This generates a torque (hereinafter referred to as a deviation preventing torque) which moves the vehicle toward the middle of the lane. According to the deviation prevention torque, the vehicle is effectively prevented from deviating from the lane.

Additionally, the vehicle steering control apparatus according to the present invention may further comprise:

circumstances recognizing means for recognizing circumstances of a moving path of the vehicle; and control gain changing means for changing a magnitude of the steering torque generated by the deviation preventing torque generating means in accordance with the circumstances of the moving path.

In this invention, the magnitude of the deviation preventing torque is changed in accordance with the circumstances of a moving path of the vehicle. The circumstances of the moving path of the vehicle includes one which allows deviation of the vehicle from the lane and one which cannot allow deviation of the vehicle from the lane. In the present invention, the deviation preventing torque is set to be larger as the necessity of prevention of deviation is increased. Accordingly, deviation of the vehicle can be positively prevented under a condition in which the necessity of prevention of deviation is high. Additionally, a flexibility of steering effort can be maintained under a condition in which the necessity of prevention of deviation is low.

Additionally, the above-mentioned invention may further comprise:

circumstances recognizing means for recognizing circumstances of a moving path of the vehicle, wherein the deviation preventing area setting means includes area width setting means for setting a width of the deviation preventing area in accordance with the circumstances of the moving path.

In this invention, the magnitude of the deviation preventing torque is changed in accordance with the circumstances of a moving path of the vehicle. The circumstances of the moving path of the vehicle includes one which allows deviation of the vehicle from the lane and one which cannot allow deviation of the vehicle from the lane. In the present invention, the width of the deviation preventing area is set to be larger as the necessity of prevention of deviation is increased. Accordingly, deviation of the vehicle can be positively prevented under a condition in which the necessity of prevention of deviation is high. Additionally, a flexibility of steering effort can be maintained under a condition in which the necessity of prevention of deviation is low.

Further, the above-mentioned invention may further comprise:

steering operation line learning means for learning a steering operation line with respect to each circumstance of the moving path, the steering operation line being achieved by a steering effort performed by a driver of the vehicle, wherein the area width setting means includes learning result reflecting means for reflecting a result of learning of the steering operation line learning means in the width of the deviation preventing area.

According to the above-mentioned invention, the steering operation line is learned for each circumstances of the moving path. According to this learning a moving line which the driver attempts to lead the vehicle can be detected for each circumstance of the moving path. In other words, an area to which the driver does not desire to move the vehicle can be detected for each circumstance of the moving path. The area to which the driver does not desire to move the vehicle corresponds to an area where the vehicle enters when the vehicle moves a moving line which is not intended by the driver. Accordingly, in such an area, the vehicle should be moved toward the middle of the lane. In the present invention, the result of the learning is reflected so that the area to which the driver does not attempt to lead the vehicle is set as the deviation preventing area. If the deviation preventing area is set as mentioned above, deviation of the vehicle toward the area which is not usually used by the driver can be effectively prevented while a flexible operation can be maintained in an area which is usually used by the driver.

Additionally, there is provided according to another aspect of the present invention a vehicle steering control apparatus comprising:

a lane area detecting mechanism detecting a lane area extending in front of a vehicle provided with the vehicle steering control apparatus;

returning steering torque generating means for generating a returning steering torque which directs the vehicle toward a middle of the lane area when the vehicle moves to a control area provided in a side area of the lane area;

intention determining means for determining whether or not a driver of the vehicle intentionally moves the vehicle to the control area; and returning steering torque restricting means for restricting generation of the returning steering torque when it is determined that the driver intentionally moves the vehicle to the control area.

According to this invention, the control area is provided in a side area of the lane area. When the vehicle enters the control area, the returning steering torque is generated for directing the vehicle toward the middle of the lane area. If the returning steering torque is generated when the vehicle is shifted to a side area of the lane area, the vehicle is prevented from deviating from the lane area unless the driver of the vehicle intends to move the vehicle outside of the lane area.

There may be a case in which the driver intentionally moves the vehicle to a side area of the lane area so as to avoid an obstacle in the lane area. In the present invention, when the vehicle is intentionally moved to the control area, the generation of the returning steering torque is prohibited. Accordingly, a good steering operation can be achieved when the vehicle moves to a side area of the lane area.

In the above-mentioned invention, the intention determining means may include continuous time measuring means for measuring a continuous time during which the vehicle moves in the control area, and the returning steering torque restricting means may include first prohibition means for prohibiting generation of the returning steering torque when the continuous time reaches a predetermined time.

Accordingly, if the driver does not intend to move the vehicle to the side area of the lane area, when the vehicle unintentionally enters the control area, the vehicle may exit the control area in a short time. Accordingly, when the continuous time during which the vehicle moves in the control area is longer than the predetermined threshold value, it can be determined that the driver intentionally moves the vehicle to the side area of the lane area. Thus, according to this invention, the intention of the driver can be accurately recognized.

Additionally, in the above-mentioned invention, the intention determining means may include prohibition condition determining means for determining whether or not the vehicle is moved to a prohibition area which is provided outside the control area, and the returning steering torque restricting means may include second prohibition means for prohibiting generation of the returning steering torque when the vehicle enters the prohibition area.

In this invention, if the driver does not intend to move the vehicle to the side area of the lane area, when the vehicle unintentionally enters the control area, the vehicle may exit the control area in a short time. Accordingly, if the vehicle reaches the prohibition area which is provided outside the control area, it can be determined that the driver intentionally moves the vehicle to the side area of the lane area. Thus, according to the present invention, intention of the driver can be accurately recognized.

Additionally, there is provided according to another aspect of the present invention a vehicle steering control apparatus comprising:

a lane area detecting mechanism detecting a lane area extending in front of a vehicle provided with the vehicle steering control apparatus; and returning steering torque generating means for generating a returning steering torque which directs the vehicle toward a middle of the lane area when the vehicle moves to a control area provided in a side area of the lane area, wherein the returning steering torque generating means generates the returning steering torque for a predetermined period after the vehicle enters the control area.

According to the above-mentioned invention, if the vehicle enters the control area, the returning steering torque is generated for the continuous period. The driver feels the returning steering torque via the steering wheel, and recognizes that the vehicle has entered the control area. After the returning steering torque is canceled, a good steering operation can be performed. If the vehicle unintentionally enters the control area, the driver may make a steering effort to return the vehicle toward a middle of the lane area after the driver feels the returning steering torque. If the vehicle intentionally enters the control area, the driver makes a steering effort to move the vehicle in the side area of the lane area.

Additionally, the vehicle steering control apparatus according to the present invention may further comprise deviation preventing means for generating a deviation preventing steering torque which directs the vehicle toward a middle of the lane area when the vehicle moves in a deviation preventing area provided outside the control area.

According to this invention, the deviation preventing area is provided outside the control area. If the vehicle enters the deviation preventing area beyond the control area, the deviation preventing torque is generated so as to move the vehicle toward a middle of the lane area. Accordingly, the vehicle is effectively prevented from deviating from the lane area.

Additionally, there is provided according to another aspect of the present invention a vehicle steering control apparatus comprising:

guide line recognizing means for recognizing a guide line provided on a road on which a vehicle provided with the vehicle steering control apparatus is moving;

steering control means for controlling a steering operation of the vehicle by detecting a positional state of the vehicle with respect to the guide line recognized by the guide line recognizing means;

alarm torque providing means for attracting the attention of a driver of the vehicle by providing a torque to a steering mechanism of the vehicle in accordance with a positional state of the vehicle with respect to the guide line;

tracking torque providing means for setting a target position on the road in accordance with a result of recognition of the guide line, and providing a torque to the steering mechanism so that the vehicle traces the target position;

moving condition detecting means for detecting a condition of movement of the vehicle; and target position correcting means for correcting the target position in accordance with the condition of movement detected by the moving condition detecting means.

According to the above-mentioned invention, since the torque provided to the steering mechanism is varied in accordance with the positional state of the vehicle with respect to the guide line, the driver can recognize how far the vehicle is located from the guide line by the torque which is transmitted to the driver via the steering mechanism. Additionally, since the torque is provided to the steering mechanism so that the vehicle traces the target position, the driver can easily maintain the vehicle to trace the target position which results in the vehicle being prevented from deviating from the road. Further, since the target position is corrected in accordance with the moving condition of the vehicle, the target position can be changed to a desired position, resulting in a stable movement of the vehicle without a sense of incongruity.

Other objects, features and advantages of the present invention will become more apparent from the following detailed description when read in conjunction with the accompanying drawings.

DETAILED DESCRIPTION OF THE PREFERRED EMBODIMENTS

Figure 1:
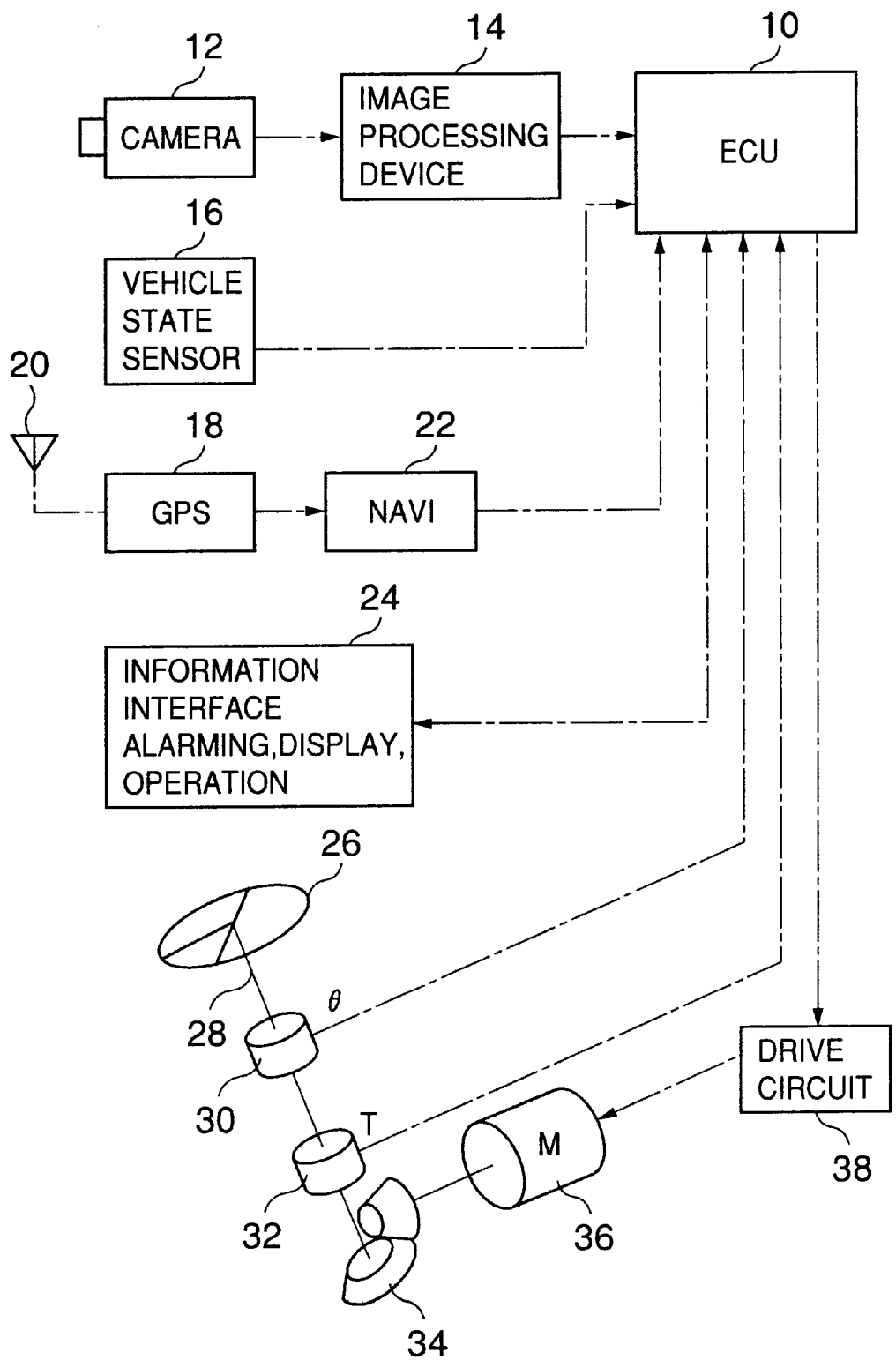
FIG. 1 is a system structure diagram of a system used in first to fifth embodiments according to the present invention.

A description will now be given of a first embodiment of the present invention. FIG. 1 is a system structure diagram of a vehicle steering control apparatus according to the first embodiment of the present invention. The vehicle steering control according to the present embodiment comprises an electronic control unit 10 (hereinafter referred to as ECU 10). The steering control apparatus according to the present embodiment is controlled by the ECU 10.

The steering control apparatus according to the present embodiment comprises a video camera 12. The video camera 12 is for taking an image of a road in front of a vehicle over a predetermined length. The video camera 12 is connected to an image processing device 14. Image signals output from the video camera 12 includes signals regarding a white line drawn on the road, a guard rail and a vehicle ahead of the vehicle provided with the video camera 12.

The image processing device 14 extracts signals corresponding to the white line drawn on the road. Signals output from the image processing device 14 include the extracted information regarding the white line. The thus-extracted white line can be recognized as a boundary line of a lane extending in front of the vehicle. The output signal of the image processing device 14 is supplied to the ECU 10. The ECU 10 recognizes an area of the lane in which the vehicle is moving based on the output signal of the image processing device 14.

The steering control apparatus includes a vehicle state sensor 16. The vehicle state sensor 16 includes sensors for detecting a vehicle speed V, a yaw rate $\gamma$, a longitudinal acceleration Gx and a transverse acceleration Gy. An output signal of the vehicle state sensor 16 is supplied to the ECU 10. The ECU 10 detects a state of the vehicle based on the output signal of the vehicle state sensor 16.

The steering control apparatus includes a GPS 18. The GPS 18 is connected to a GPS antenna 20. The GPS 18 can specify a latitude and a longitude of the vehicle. An output signal of the GPS 18 is supplied to a navigation device 22. The navigation device 22 is connected to the ECU 10. The ECU 10 detects a position of the vehicle and a radius of the road on which the vehicle is moving based on data supplied by the navigation device 22.

The steering control apparatus includes an information interface 24. The information interface 24 has a function as an alarming unit, a function as a display unit and a function as an operational unit. The information interface 24 is connected to the ECU 10. In the steering control apparatus according to the present embodiment, a desired operation is performed through the information interface 24. Additionally, in the steering control apparatus according to the present embodiment, required alarming and display are performed through the information interface 24.

The steering control apparatus includes a steering wheel 26. The steering wheel 26 is connected to a steering shaft 28. The steering shaft 28 is provided with a steering angle sensor 30. The steering angle sensor 30 generates an output signal corresponding to a steering angle $\theta$ of the steering wheel 26. The output signal of the steering angle sensor 30 is supplied to the ECU 10. The ECU 10 detects the steering angle $\theta$ based on the output signal of the steering angle sensor 30.

The steering shaft 28 is provided with a torque sensor 32. The torque sensor 32 outputs an electric signal corresponding to a steering torque T which is transmitted to the steering shaft 28. The output signal of the torque sensor 32 is supplied to the ECU 10. The ECU 10 detects the steering torque T based on the output signal of the torque sensor 32. The steering shaft 28 is connected to a motor 36 via a gear mechanism 34. The gear a mechanism 34 transmits a torque (hereinafter referred to as a motor torque TM) generated by the motor 36 to the steering shaft 28. The motor 36 is connected to the ECU 10 via a drive circuit 38. The drive circuit 38 supplies to the motor 36 a drive current corresponding to an instruction signal generated by the ECU 10. Accordingly, the motor 36 generates the motor torque TM in response to the instruction signal generated by the ECU 10.

A description will now be given, with reference to FIGS. 2 and 3, of a basic operation of the steering control apparatus according to the present embodiment.

Figure 2:
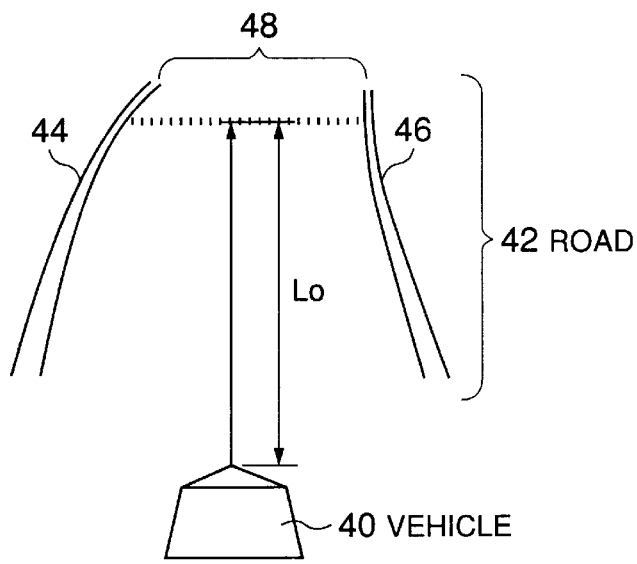
FIG. 2 is a perspective view of a vehicle provided with a steering control apparatus according to the present invention and a road extending in front of the vehicle.

FIG. 2 is a perspective view of a vehicle 40 provided with the steering control apparatus according to the present embodiment and a road 42 extending in front of the vehicle 40. White lines 44 and 46 are drawn on the road 42 for indicating boundaries of lanes. The video camera 12 provided in the vehicle 40 takes an image of the white lines 44 and 46 in front of the vehicle 40. The image processing device 14 extracts the white lines 44 and 46 by processing the image signal supplied by the video camera 12, and supplies data regarding the positions of the white lines 44 and 46 to the ECU 10.

The ECU 10 recognizes the positions of the white lines 44 and 46 based on the data regarding the white lines 44 and 46 in front of the vehicle, the data being supplied by the image processing device 14. Then, the ECU recognizes an area between the white lines 44 and 46 as a lane 48 on which the vehicle 40 is moving. Additionally, the ECU 10 assumes a moving line of the vehicle 40 based on a state of the vehicle 40 such as a vehicle speed V or a yaw rate γ and a steering angle θ. Hereinafter, this moving line is referred to as an "assumed moving line".

The ECU 10 detects an area of the lane 48 where the assumed moving line exists a predetermined distance Lo ahead of the vehicle 40. Then, the ECU 10 renders the motor 36 to generate a motor torque TM for correcting the steering angle θ so that the assumed moving line matches a target moving line. Hereinafter, this motor torque TM is referred to as a "returning steering torque".

Figure 3:
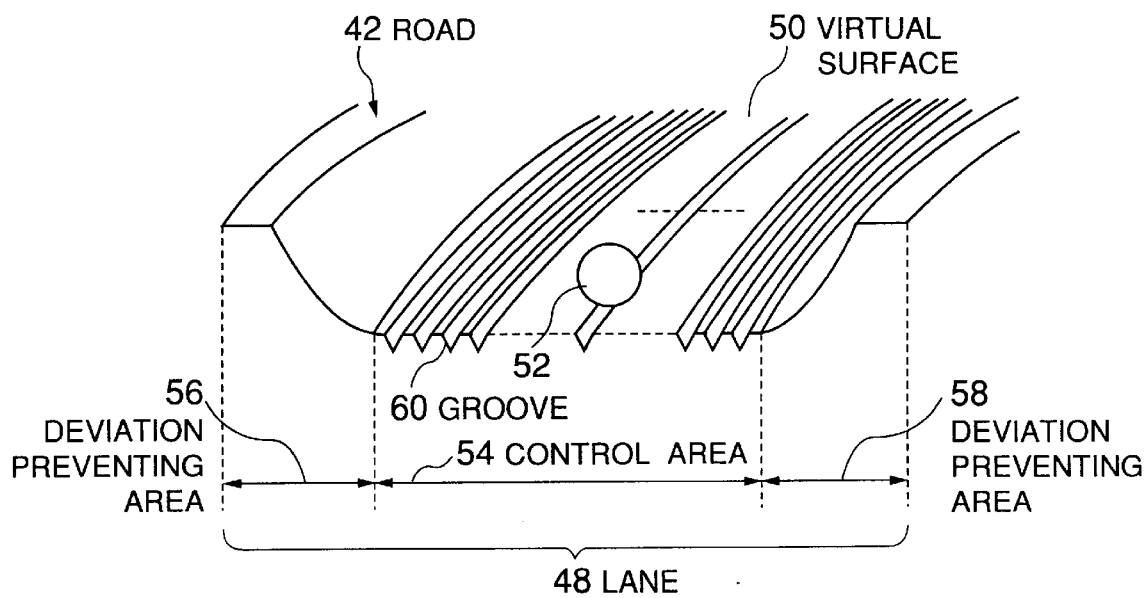
FIG. 3 is a perspective view of a virtual surface of the road on which the vehicle provided with the steering control apparatus according to the present invention is moving and a virtual sphere provided on the virtual surface.

FIG. 3 is a perspective view of a virtual surface 50 of the road 42 and a virtual sphere 52 provided on the virtual surface 50. The road 42 actually has a flat surface over the entire width. The steering control apparatus according to the present embodiment generates the returning steering torque TM so that a behavior of the vehicle 40 is similar to a behavior of the virtual sphere 52 on the virtual surface 50 when the vehicle 40 moves on the road 42.

In FIG. 3, a control area 54 is set in the middle of the lane 48 and deviation preventing areas 56 and 58 are set on each side of the lane 48. A plurality of grooves 60 are set in the control area 54, each of the grooves extending along the lane 48 parallel to each other in a direction of the width of the lane 48. The grooves 60 can be represented by grooves provided on the flat control area 54 in the virtual surface 50. Additionally, in the virtual surface 50, the deviation preventing areas 56 and 58 can be represented by a configuration in which the surface is raised from an inner side of the lane 48 toward each side of the lane 48.

The virtual sphere 52 provided on the virtual surface 50 moves so as to acquire a stable position in the lane 48. The virtual sphere 52 on the virtual surface 50 is set to a stable state when the virtual sphere 52 is located in the control area 54 rather than located in one of the deviation preventing areas 56 and 58. Additionally, the virtual sphere in the control area 54 is set to a stable state when the virtual sphere 52 is engaged with one of the grooves 60. Accordingly, the sphere 52 on the virtual surface 50 tends to move on the road 42 while maintaining an engagement with one of the grooves 60.

In the present embodiment, the ECU 10 sets the control area 54 and the deviation preventing areas 56 and 58 in the lane 48 detected by the video camera 12, and sets a predetermined number of grooves 60 in the control area 54.

The ECU 10 selects one of the grooves 60 as a target moving line, and generates the returning steering torque for matching the assumed moving line of the vehicle 40 with the selected target moving line. Additionally, the ECU 10 generates the returning steering torque TM corresponding to a difference between the assumed moving line and the target moving line when the assumed moving line of the vehicle 40 enters one of the deviation preventing areas 56 and 58. Hereinafter, this returning steering torque is referred to as a "deviation preventing torque TM".

According to the above-mentioned process, the vehicle 40 moves on the road 42 as if the vehicle 40 traces one of the grooves 60 (hereinafter referred to as a selected groove) which is selected as the target moving line. Additionally, when the moving line of the vehicle 40 is shifted toward one of the sides of the road 42, the deviation preventing torque TM is generated so that a deviation of the vehicle 40 from the lane 48 is prevented. Thus, according to the steering control apparatus of the present embodiment, the behavior of the vehicle 40 moving on the road 42 can be similar to that of the virtual sphere 52 moving on the virtual surface 50.

The moving line which provides a comfortable feel to a driver of the vehicle moving on the road 42 is not always the same. Accordingly, there may occur a difference between the selected groove and a line (hereinafter referred to as a steering operation line) along which the driver attempts to move the vehicle 40. If there is such a difference between the steering operation line and the selected groove, the returning steering torque TM generated by the steering control apparatus is a force which resists the steering effort of the driver. Accordingly, if the selected groove is fixed to the same groove among the grooves 60, an assist function for tracing a moving line desired by the driver cannot be achieved.

In order to eliminate the above-mentioned problem, the steering control apparatus according to the present embodiment has a feature in that one of the grooves 60 which approximates the steering operation line is selected as a new selected groove when a difference occurs between the steering operation groove and the selected groove. A description will be given below, with reference to FIG. 4, of the above mentioned feature.

Figure 4:
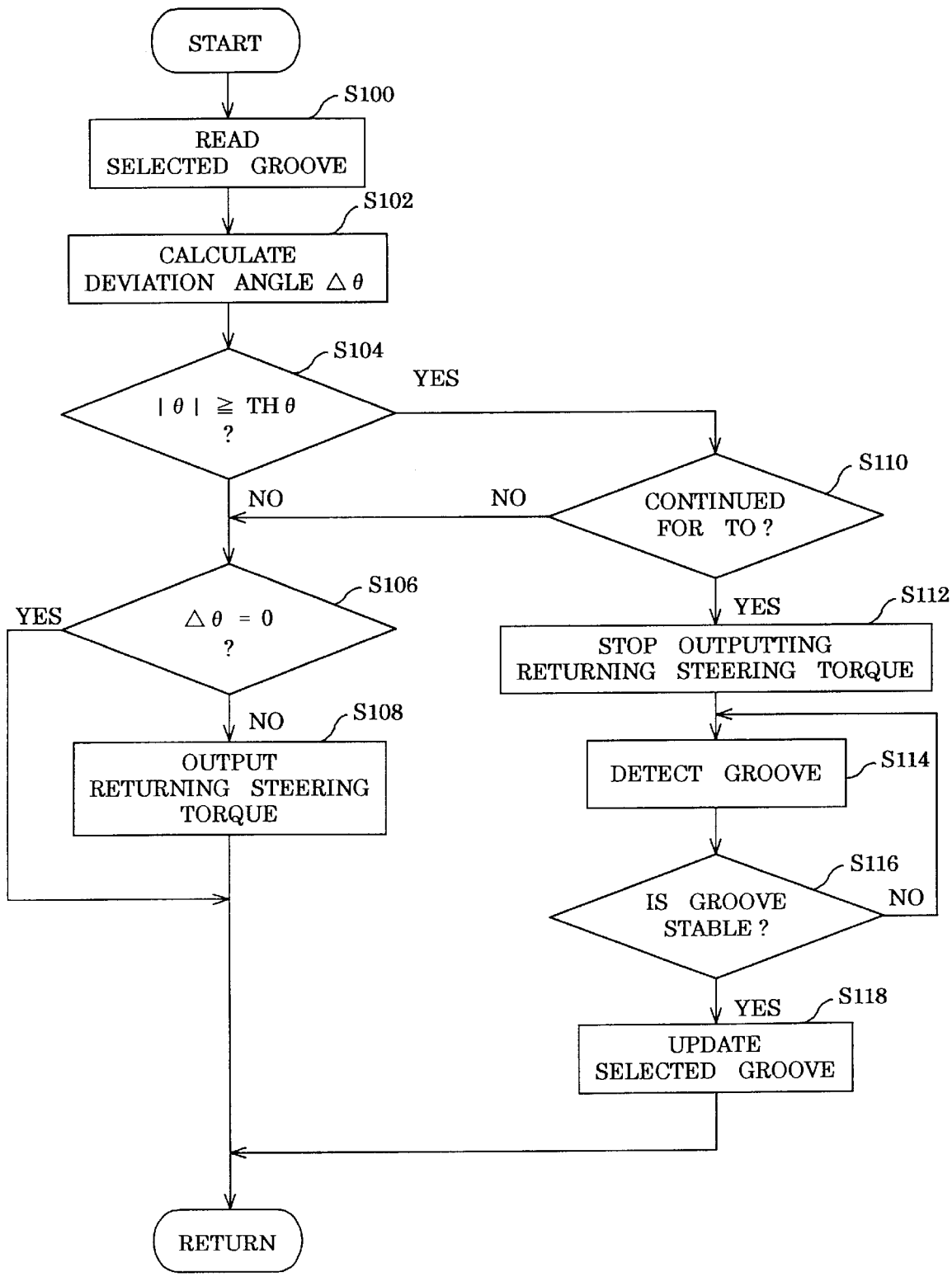
FIG. 4 is a flowchart of an example of a control routine performed by the first embodiment of the present invention.

FIG. 4 is a flowchart of an example of a control routine performed by the ECU 10 so as to achieve the above-mentioned function. The routine shown in FIG. 4 is repeatedly started when the process of the routine is completed. When the routine shown in FIG. 4 is started, the process of step S100 is performed first.

In step S100, one of the grooves 60, which was stored as the selected groove by the ECU 10 by a previous process or a factory delivery setting, is read.

In step S102, a deviation angle Δθ is calculated. The deviation angle Δθ is a steering angle required for matching the moving line of the vehicle 40, that is, the line (steering operation line) along which the driver attempts to move the vehicle 40, with the selected groove.

In step S104, it is determined whether or not the absolute value |Δθ| of the deviation angle Δθ is equal to or greater than a predetermined threshold value THθ. The threshold value THθ is a value for determining whether the driver intends to achieve the steering operation line which does not match the selected groove. Accordingly, if it is determined, in step S104, that |Δθ|≧THθ is not established, it can be determined that the driver does not intend to achieve the steering operation line which does not match the selected groove. In this case, the process of step S106 is performed next.

In step S106, it is determined whether or not the deviation angle Δθ is equal to "0". If Δθ=0 is established, it can be determined that the moving line of the vehicle 40 matches the selected groove, that is, the target moving line. In this case, the present routine is ended without performing any process thereafter. On the other hand, if it is determined that Δθ=0 is not established, the process of step S108 is performed next.

In step S108, a returning steering torque TM is output for rendering the deviation angle Δθ to be equal to "0", that is, for matching the moving line of the vehicle 40 with the target moving line. After the process of step S108 is completed, a condition which is preferable to perform a steering effort to match the moving line of the vehicle 40 with the target moving line is established. Thus, according to the above-mentioned process, the vehicle 40 can be easily and safely moved along the target moving line. After the process of step S108 is completed, the present routine is ended.

If it is determined, in step S104 of the present routine, that |Δθ|≧THθ is established, it can be determined that the driver leads the vehicle to trace a line different from the target moving line. In this case, the process of step S110 is performed subsequent to step S104.

In step S110, it is determined whether or not the condition of step S104 continues for a predetermined time period t0. As a result, if it is determined that the condition of step S104 continues for a predetermined time period t0, it can be determined that the driver intentionally leads the vehicle 40 on a line different form the selected groove, that is, the driver attempts to achieve a steering operation line different from the selected groove. In this case, the process of step S102 is performed next so as to change the selected groove to one which matches the steering operation line. On the other hand, if it is determined that |Δθ|≧THθ does not continue for the predetermined time period t0, the driver's intention cannot be determined. Accordingly, if such a determination is made in step S110, the process of step S106 is performed next.

In step S112, the output of the returning steering torque TM is stopped. After the process of step S112 is performed, the driver can easily achieve a steering operation line which does not match the selected groove.

In step S114, one of the grooves 60 which approximates the moving line of the vehicle 40 is detected.

In step S116, it is determined whether or not one of the grooves 60 detected in step S114 is fixed to a specific one of the grooves 60. As a result, if it is determined that the detected groove is not yet fixed, the process of step S114 is performed again. On the other hand, if it is determined that the detected groove is fixed, the process of step 118 is performed next.

In step S118, a process for updating the selected groove is performed. In step S118, the one of the grooves 60, which is determined to be the one which matches the moving line of the vehicle 40 in step S114 and S116, is stored as a new selected groove. After the process of step S118 is completed, the present routine is ended.

According to the above-mentioned process, when the driver intentionally leads the vehicle 40 to a line which is different from the target line, 1) the output of the returning steering torque TM which prevents the steering effort is stopped; and 2) the returning steering torque TM, which leads the vehicle 40 to a line as a new target moving line to which the driver intentionally leads the vehicle 40, can be generated. Thus, according to the steering control apparatus of the present embodiment, the vehicle can be easily and safely maintained on a moving line which provides a comfortable feel to the driver.

It should be noted that, in the above-mentioned embodiment, the grooves 60 correspond to "reference lines". A "reference line setting means" is achieved by the ECU setting the plurality of grooves 60 on the road 42. A "target moving line selecting means" is achieved by the ECU performing the process of steps S114 to S118. A "returning steering torque generating means" is achieved by the ECU 10 performing the process of steps S100 to S108.

Additionally, in the above-mentioned embodiment, a "deviation preventing area setting means" is achieved by the ECU setting the deviation preventing areas 56 and 58 on each side of the lane 48. A "deviation preventing torque generating means" is achieved by the ECU 10 to render the motor 36 to generate the deviation preventing torque TM.

A description will now be given, with reference to FIG. 5, of a second embodiment of the present embodiment. A steering control apparatus according to the second embodiment has a feature in that a determination as to whether or not the driver intends to lead the vehicle 40 to a line different form the target moving line is made based on a magnitude of a steering torque T input to the steering wheel 26. The steering control apparatus according to the present embodiment can be achieved by the ECU 10 performing a routine shown in FIG. 5 in the system structure shown in FIG. 1

Figure 5:
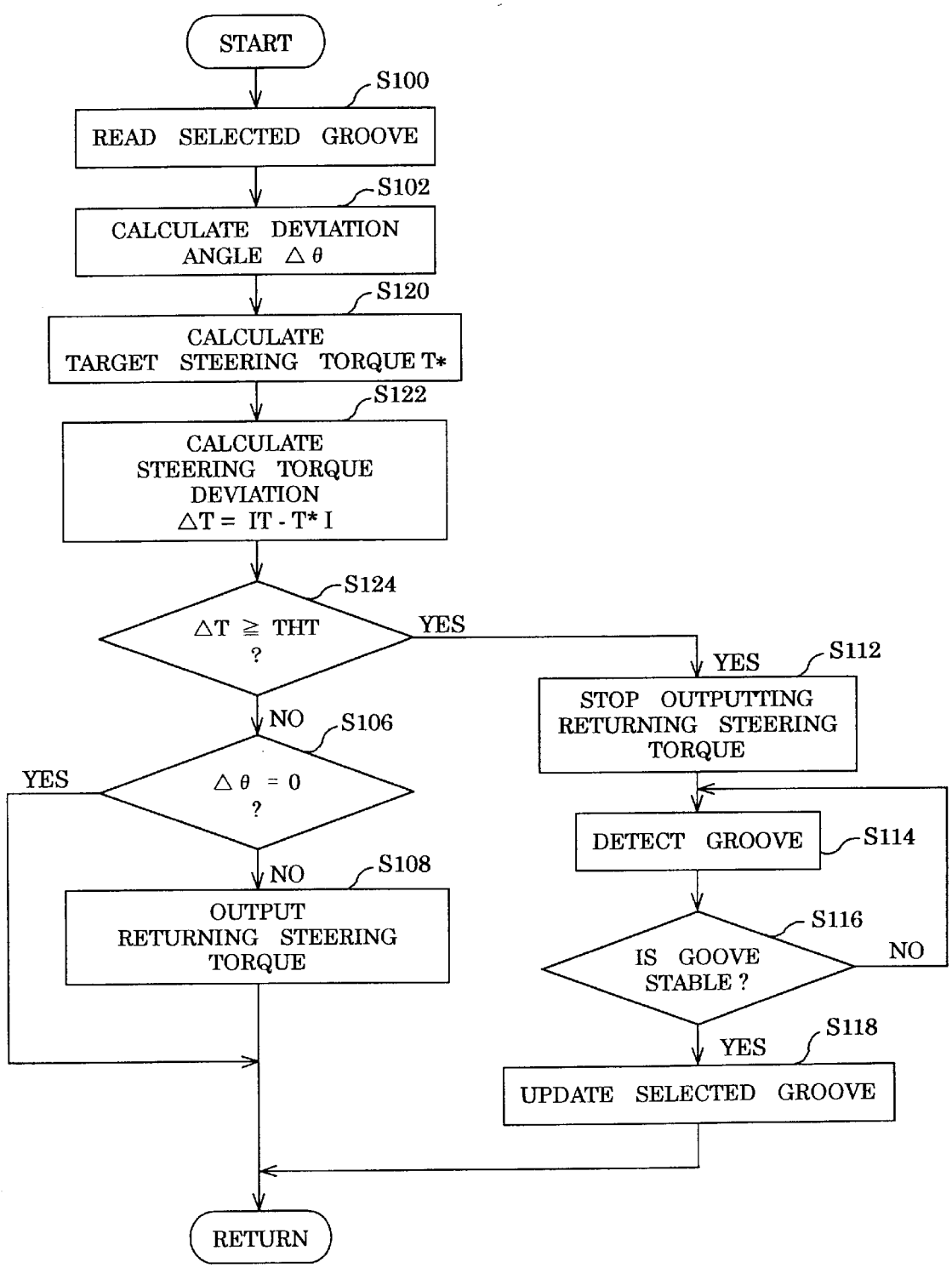
FIG. 5 is a flowchart of an example of a control routine performed by the second embodiment of the present invention.

FIG. 5 is a flowchart of an example of a control routine performed in the steering control apparatus according to the second embodiment. The routine shown in FIG. 5 is repeatedly started after the whole process thereof is completed. In FIG. 5, steps that are the same as the steps shown in FIG. 4 are given the same step numbers, and descriptions thereof will be omitted.

In the routine shown in FIG. 5, the process of step S120 is performed subsequent to the process of steps S100 and S102.

In step S120, a target steering torque T* is calculated. The target steering torque T* is a steering torque which is needed to move the vehicle 40 along the target moving line, that is, to move the vehicle 40 along the selected groove. In step S120, the target steering torque T* is calculated based on a radius of the selected groove, a vehicle speed V, a steering angle θ, a yaw rate γ, and a return steering torque TM.

In step S122, a steering torque deviation ΔT is calculated. The steering torque deviation ΔT is an absolute value |T−T*| of a difference between the steering torque T detected by the torque sensor 32 and the target steering torque T*. A value of the steering torque deviation ΔT can be recognized as a value of the steering torque which is input by the driver to move the vehicle 40 from the target moving line.

In step S124, the steering torque deviation ΔT is equal to or greater than a predetermined threshold torque THT. As a result, if it is determined that ΔT≧THT is not established, it can be determined that the driver does not intend to move the vehicle 40 off the target moving line. In this case, the process of step S106 and subsequent steps is performed so that the moving line of the vehicle 40 matches the target moving line.

On the other hand, if it is determined that $\Delta T \geq THT$ is established, it can be determined that the driver intends to move the vehicle off the target moving line. In this case, the process of step S112 and the subsequent steps is performed, that is, the process for updating the selected groove is performed so as to match the line to which the driver leads the vehicle 40 with the target moving line.

As mentioned above, according to the steering control apparatus of the present embodiment, the same function as the first embodiment can be achieved by using the steering torque T as a parameter. Thus, according to the steering control apparatus according to the present embodiment, the vehicle 40 can be easily and safely maintained on a moving line which provides a comfortable feel to the driver.

It should be noted that, in the present embodiment, a "return steering torque generating means" is achieved by the ECU 10 performing the process of steps S100, S102, S120 to S124, S106 and S108.

A description will now be given, with reference to FIG. 6, of a third embodiment of the present invention. A steering control apparatus according to the third embodiment has a feature that a width of each of the deviation preventing areas 56 and 58 is changed in response to circumstances of movement of a vehicle. The steering control apparatus according to the present invention can be achieved by the ECU 10 performing a routine shown in FIG. 6 in the system structure shown in FIG. 1.

The necessity of prevention of the vehicle from being moved off the lane 48 changes in accordance with the circumstances of movement of the vehicle 40. Specifically, when the vehicle 40 moves on a running lane of a highway, the necessity of prevention of the vehicle from moving off the running lane toward a passing lane is high. On the other hand, the necessity of prevention of the vehicle from moving off the running lane toward a road side area is not so high.

In the steering control apparatus according to the present embodiment, in order to increase safety of a vehicle while maintaining a freedom of steering effort, it is preferable to set the deviation preventing area 56 and 58 to be wider when the necessity of prevention of deviation is high and to set the deviation preventing areas 56 and 58 to be narrower when the necessity of prevention of deviation is low. Accordingly, it is appropriate to set the width of each of the deviation preventing areas 56 and 58 in response to circumstances of movement of the vehicle 40.

Additionally, when the vehicle 40 moves on the road 42, an area of the lane 48 which is normally used is changed in response to circumstances of movement of the vehicle. Specifically, if the vehicle 40 moves along a curve, the driver tends to lead the vehicle on a line shifted toward an inner side of the lane. Accordingly, when the vehicle 40 moves along a curve, an area on the inner side is frequently used as compared to an area on an outer side of the lane.

In the steering control apparatus according to the present embodiment, if is preferable to set many grooves 60 in an area which is normally used so as to match the target moving line with a line which provides a comfortable feel to the driver. Additionally, in order to effectively prevent the vehicle 40 from moving off an area which is normally used, it is preferable to generate the deviation preventing torque TM when the vehicle 40 is located in an area which is normally not used. Thus, in the present embodiment, it is appropriate to set a width of each of the deviation preventing areas 56 and 58 in response to circumstances of movement of the vehicle 40.

Figure 6:
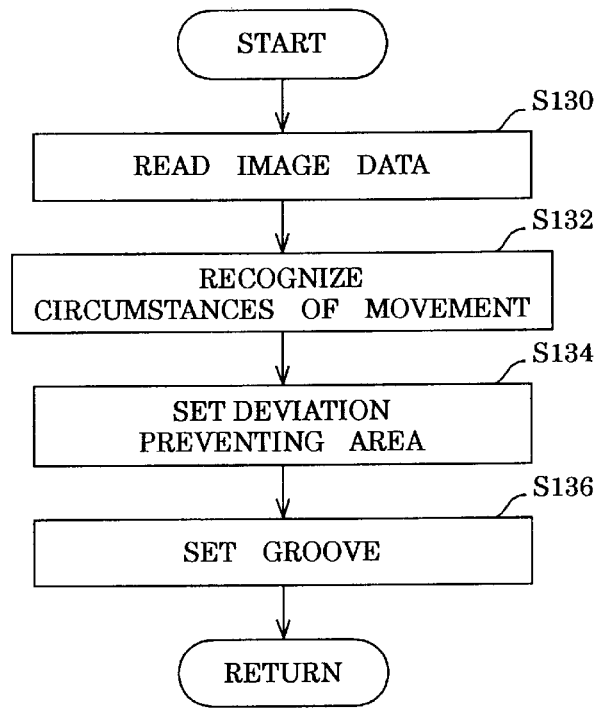
FIG. 6 is a flowchart of an example of a control routine performed by the third embodiment of the present invention.

FIG. 6 is a flowchart of an example of a control routine performed by the ECU 10 so as to achieve the above-mentioned function. The routine shown in FIG. 6 is a periodic interruption routine which is started at every pre-determined period. When the routine shown in FIG. 6 is started, the process of step S130 is performed first.

In step S130, image data generated by the video camera 12 and the image processing device 14 is read.

In step S132, the circumstances of the vehicle 40 is recognized based on the thus read image data or the image data and data supplied by the navigation device 22. More specifically, in step S132, a type of the road 42 (straight road, a curve, a local road, an automobile road, a running lane, a passing lane), a radius of the road 42 and a slope of the road 42 are recognized based on the image data.

In step 134, the deviation preventing areas 56 and 58 according to the circumstances of movement recognized in step S132 are set in the lane 48. The ECU 10 stores information of the width of each of the deviation preventing areas 56 and 58. In step S134, the deviation preventing areas 56 and 58 are set based on the stored data.

In step S136, an area between the deviation preventing areas 56 and 58 set in the above-mentioned step 134 is set as the control area 54, and a plurality of grooves 60 which do not overlap with each other are set in the control area 54. After the process of step S136 is completed, the present routine is ended.

According to the above-mentioned process, many grooves 60 can be set in the area which is normally used. Additionally, wide deviation preventing areas 56 and 58 can be set in an area which is not normally used. According to the above-mentioned setting, the target moving line can accurately match the line to which the driver attempts to lead the vehicle 40, and deviation of the vehicle 40 toward the area which is not normally used can be effectively prevented. Thus, according to the steering control apparatus of the present embodiment, a practical steering assist can be performed.

It should be noted that, in the present embodiment, a "circumstances recognizing means" is achieved by the ECU 10 performing the process of step S130, and an "area width setting means" is achieved by the ECU 10 performing the process of step S134.

A description will now be given, with reference to FIG. 7, of a fourth embodiment according to the present invention. A steering control apparatus according to the fourth embodiment has a feature that a magnitude of the deviation preventing torque TM is changed in response to the circumstances of movement of the vehicle 40. The steering control apparatus according to the present embodiment is achieved by the ECU 10 performing the routine shown in FIG. 7 in the system structure shown in FIG. 1.

Figure 7:
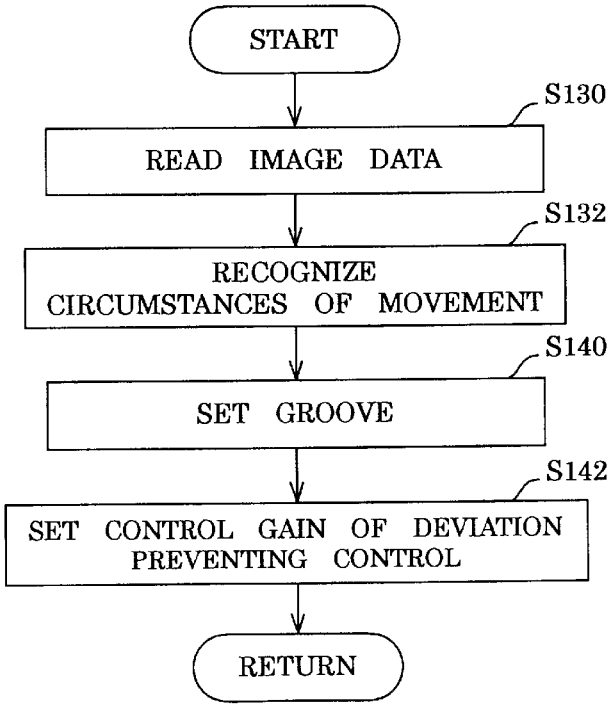
FIG. 7 is a flowchart of an example of a control routine performed by the fourth embodiment of the present invention.

FIG. 7 is a flowchart of an example of the control routine performed by the steering control apparatus according to the fourth embodiment of the present invention. The routine shown in FIG. 7 is repeatedly started every time the process of the routine is completed. In FIG. 7, steps that are the same as the steps shown in FIG. 6 are given the same step numbers, and descriptions thereof will be omitted.

In the routine shown in FIG. 7, the process of step S140 is performed subsequent to the process of steps S130 and S132. In step S140, the lane 48 is divided into the control area 54 and the deviation preventing areas 56 and 58 according to a previously determined rule, and a predetermined number of grooves 60 are set in the control area 54.

In step S142, a control gain of a deviation preventing control is set in response to the circumstances of the vehicle. After the process of step S142 is completed, the present routine is ended.

The steering control apparatus according to the present embodiment generates a deviation preventing torque TM corresponding to the control gain determined in step 142 when the moving line of the vehicle 40 overlaps the deviation preventing areas 56 and 58. Additionally, in step S142, the control gain is set to a greater value with respect to the deviation preventing area which is recognized to highly require the necessity of prevention of deviation of the vehicle 40. Further, the control gain is set to a smaller value for the deviation preventing area including a side area which is frequently used, and is set to a greater value for the deviation preventing area including a side area which is not frequently used.

Thus, according to the present embodiment, a relatively small deviation preventing torque TM is generated in the deviation preventing area which is frequently used in a normal condition, and a relatively large deviation preventing torque TM is generated in the deviation preventing area which is barely used in a normal condition. It is appropriate for the deviation preventing area which is frequently used in a normal condition to maintain a high-freedom of a steering effort. Additionally, it is appropriate for the deviation preventing area which is barely used in a normal condition to generate a large deviation preventing torque TM so as to prevent the vehicle 40 entering the deviation preventing area. According to the above-mentioned setting, these two requirements can be achieved concurrently. Thus, according to the steering control apparatus of the present embodiment, a practical steering assist can be performed similar to the above-mentioned third embodiment.

It should be noted that, in the above-mentioned embodiment, a "circumstances recognizing means" is achieved by the ECU 10 performing the process of step S130, and a "control gain changing means" is achieved by the ECU 10 performing the process of step S142.

A description will now be given, with reference to FIG. 8, of a fifth embodiment of the present invention. A steering apparatus according to the fifth embodiment is achieved by the ECU 10 performing a routine similar to the routine shown in FIG. 7 and a routine shown in FIG. 8 in the system structure shown in FIG. 1. The steering control apparatus according to the present embodiment has a feature in that the steering operation line with respect to a driver's steering effort is learned in relation to the circumstances of movement of the vehicle, and results of learning are reflected in the setting of the deviation preventing areas or the setting of the control gain of the deviation preventing torque TM.

Figure 8:
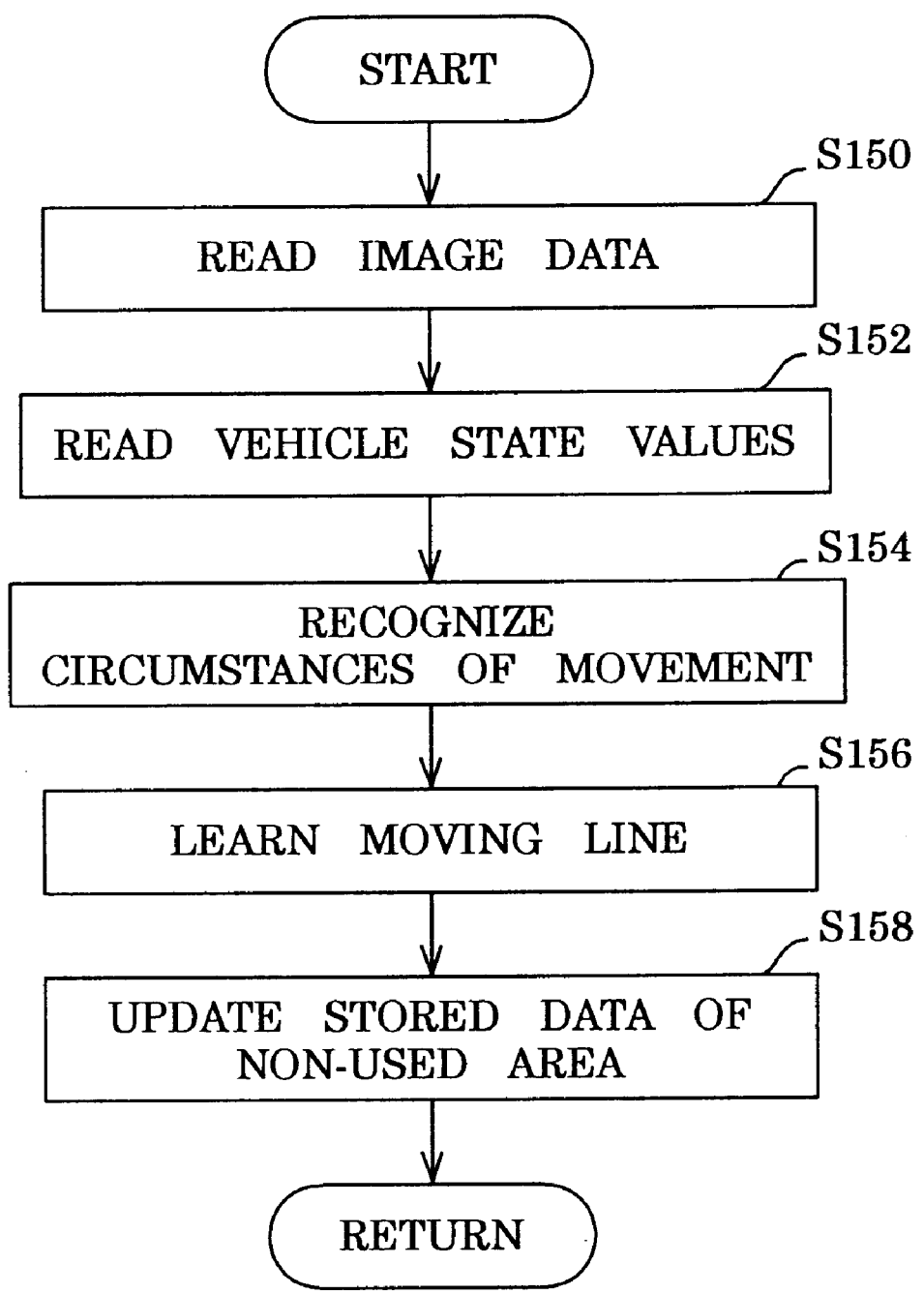
FIG. 8 is a flowchart of an example of a control routine performed by the fifth embodiment of the present invention.

FIG. 8 is a flowchart of an example of the control routine performed by the ECU 10 so as to achieve the above-mentioned function. The routine shown in FIG. 8 is a periodic interruption routine which is started at every predetermined time. When the routine shown in FIG. 8 is started, the process of step S150 is performed.

In step S150, image data generated by the video camera 12 and the image processing apparatus 14 is read.

In step S152, vehicle state values (a vehicle speed V, a yaw rate γ, a steering angle θ, etc.) are read.

In step S154, the circumstances of the vehicle 40 are recognized. It should be noted that, in step S154, a combination of a state of the road 42 and a state of the vehicle 40 are recognized as the circumstances of movement of the vehicle 40.

In step S156, the steering operation line is learned with respect to the circumstances of movement of the vehicle 40. In step S156, specifically, the steering operation line in a straight road or the steering operation line when moving at a specific speed V along a curve having a specific radius are learned.

In step S158, the stored data with respect to a non-used area is updated. When the steering operation line with respect to the circumstances of movement is learned, an area which is not used for each circumstance of movement in the lane can be specified. In step S158, the stored data with respect to the non-used area with respect to each circumstance of movement is updated. After the process of step S158 is completed, the present routine is ended.

In the present embodiment, the ECU 10 performs a routine similar to the routine shown in FIG. 6 or FIG. 7. Specifically, the ECU 10 performs a routine (similar to the routine of FIG. 6) for setting the deviation preventing areas 56 and 58 with respect to the circumstances of movement which are recognized from a state of the road 42 and a state of the vehicle 40. Alternatively, the ECU 10 may perform a routine (similar to the routine of FIG. 7) for setting a control gain of the deviation preventing torque TM with respect to the circumstances of movement which are recognized from a state of the road 42 and a state of the vehicle 40.

In the above-mentioned routines, the setting of the deviation preventing areas 56 and 58 or the setting of the deviation preventing torque TM is performed based on the stored data which is updated in the above-mentioned step 158 (FIG. 8). According to the above-mentioned process, the line to which the driver leads the vehicle 40 can be reflected in the setting of the deviation preventing areas 56 and 58 or the setting of a control gain of the deviation preventing torque TM. Thus, according to the steering control apparatus according to the present embodiment, a high degree of freedom can be maintained in a steering effort in an area which the driver usually uses, while effectively preventing the vehicle 40 from deviating to an area which the driver does not use usually.

It should be noted that, in the above-mentioned embodiment, a "steering operation line learning means" is achieved by the ECU performing the process of steps 150 to 156, and a "learning result reflecting means" is achieved by the ECU 10 setting the deviation preventing areas 56 and 58 based on the result of learning of the steering operation line.

A description will now be given, with reference to FIGS. 9 to 19, of sixth to tenth embodiments of the present invention. Each of vehicle steering control apparatuses according to the sixth to tenth embodiment has the same structure as that shown in FIG. 1, and a description thereof will be omitted.

In the vehicle steering control apparatuses according to the sixth to tenth embodiments, the ECU 10 detects an area of the lane 48 in which the assumed moving line exists ahead of the vehicle by the predetermined distance L0. As a result, if the assumed moving line exists on a side area of the lane 48, the ECU 10 controls the motor 36 to generate a motor torque TM for correcting a steering angle θ so as to shift the moving line of the vehicle 40 toward the middle of the lane 48. Hereinafter, this torque is referred to as a returning steering torque TM.

Figure 9:
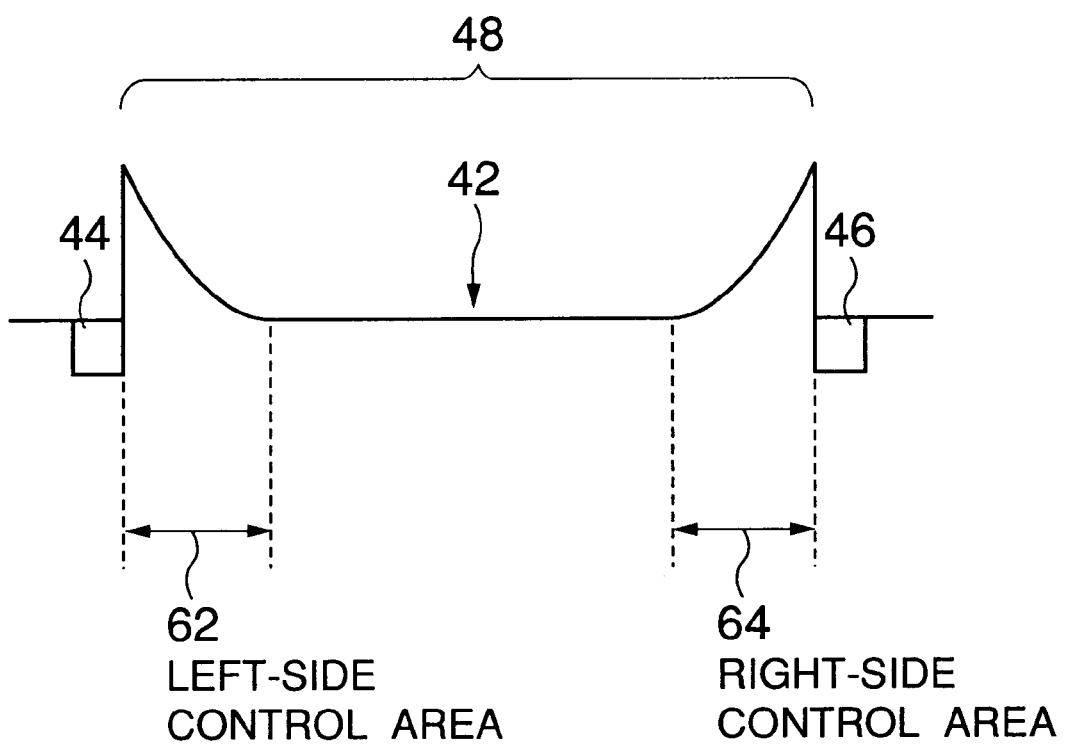
FIG. 9 is an illustration of a virtual cross section of a road for explaining a basic operation of a steering control apparatus according to a sixth embodiment of the present invention.

FIG. 9 shows a virtual cross section of the road 42 (hereinafter referred to as a virtual cross-section (III)). The road 42 actually has a generally flat shape over the entire width. The steering control apparatus according to the sixth to tenth embodiments achieves an operation as if the vehicle 40 moves on a road having the virtual cross section (III).

In the virtual cross section (III), a left-side control area 62 and a right-side control area 64 are provided inside of the white lines 44 and 46 within the lane 48. The virtual cross section (III) is configured so that the middle of the lane 48 is flat and the left-side and right-side control areas are gradually raised as they approach the respective white lines 44 and 46.

The steering control apparatus generates the returning steering torque TM for correcting the moving line to shift toward the middle of the lane 48 when the vehicle 40 is lead to the side area of the lane 48. The area for which the steering control apparatus generates the returning steering torque TM is generated corresponds to the left-side and right-side control areas 62 and 64 shown in FIG. 9. Additionally, the returning steering torque TM generated by the steering control apparatus is increased as the vehicle 40 approaches the white line 44 or 46. Accordingly, a steering characteristic similar to that of a vehicle moving on a road having the virtual cross section (III) can be achieved by the sixth to tenth embodiments.

A description will now be given of a feature of the steering control apparatus according to the sixth embodiment of the present invention.

Figure 10:
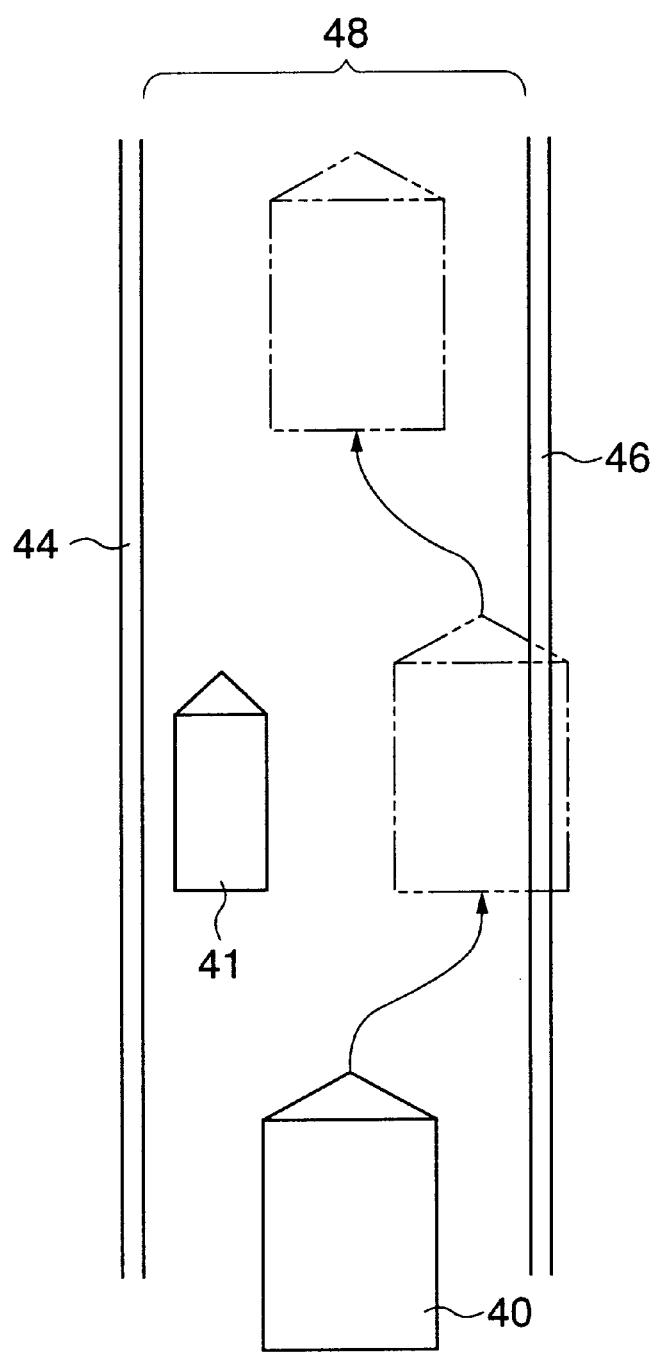
FIG. 10 is an illustration showing a moving line of a vehicle passing a motorcycle.

FIG. 10 shows a moving line of the vehicle 40 when the vehicle 40 passes a motorcycle 41 on the road 42. An obstacle such as the motorcycle 41 may exist on the road 42. The vehicle 40 must temporarily move on a side area of the lane 48 so as to pass such an obstacle. The driver of the vehicle 40 may intentionally move the vehicle 40 to the side area of the lane 48.

The returning steering torque TM generated by the steering control apparatus according to the present embodiment is effective when the driver of the vehicle 40 does not intend to move the vehicle 40 to the side area of the lane 48. However, the generation of the returning steering torque TM is not preferable so as to achieve a good steering characteristic when the driver intentionally moves the vehicle 40 to the side area of the lane 48. The steering control apparatus according to the present embodiment has a feature in that the generation of the returning steering torque TM is restricted when the driver of the vehicle 40 intentionally moves the vehicle 40 to the side area of the lane 48.

Figure 11:
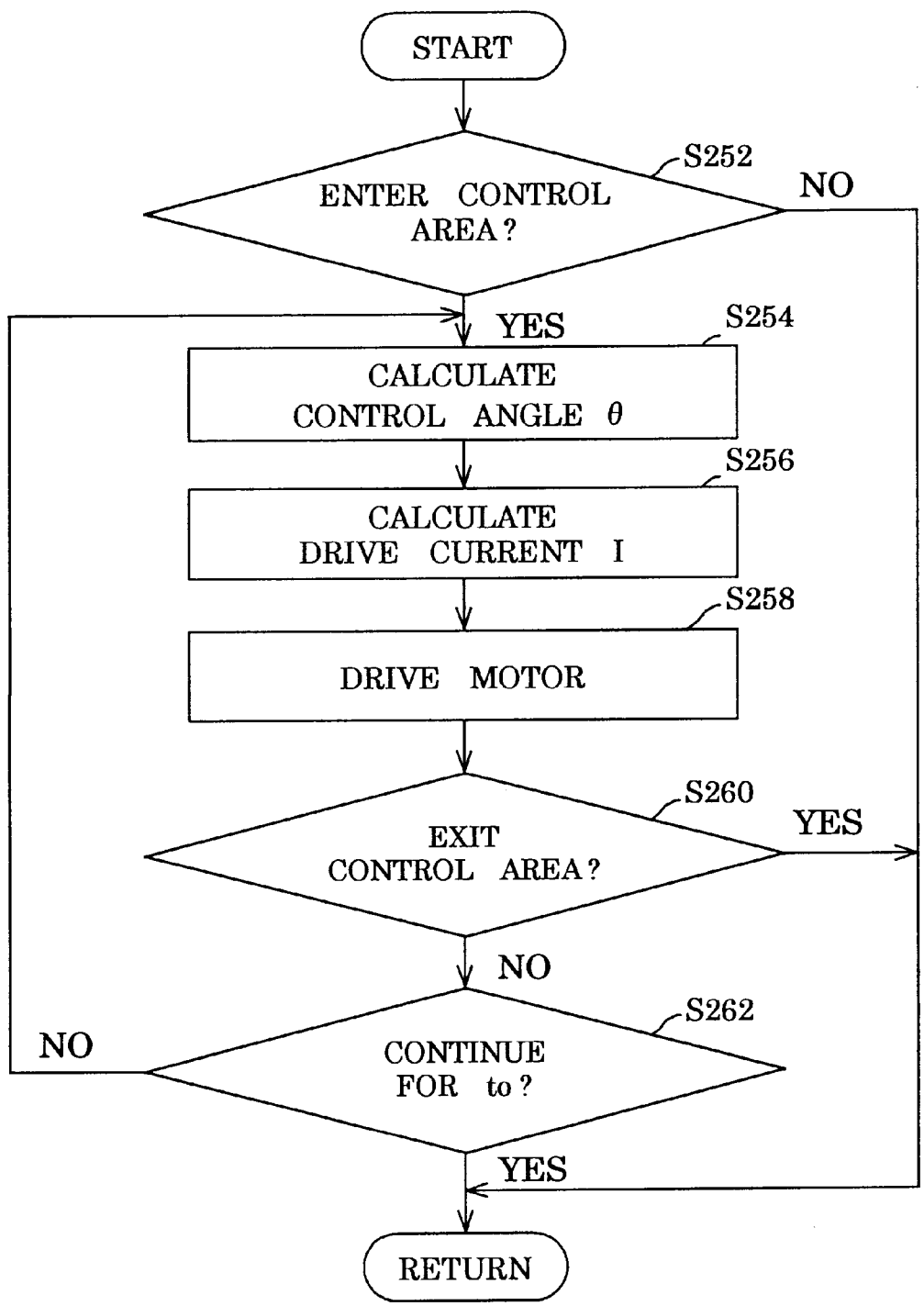
FIG. 11 is a flowchart of a control routine performed by the steering control apparatus according to the sixth embodiment.

FIG. 11 is a flowchart of a control routine performed by the ECU 10 so as to achieve the above-mentioned function. The routine shown in FIG. 10 is repeated each time the process of the routine is completed. When the routine shown in FIG. 10 is started, the process of step S252 is performed.

In step S252, it is determined whether or not the vehicle 40 has entered one of the left-side control area 62 and the right-side control area 64 in a duration from the immediately preceding process to the present process. As a result, if it is determined that the vehicle 40 has not entered one of the left-side and right-side control areas 62 and 64, the present routine is ended without performing any process thereafter. On the other hand, if it is determined that the vehicle 40 has entered one of the left-side and right-side control areas 62 and 64, the process of step S254 is performed.

In step S254, a control angle θ is calculated. The control angle θ is an angle which should be provided to the steering shaft 28 so that the assumed moving line of the vehicle 40 matches the center of the lane 48. In step S254, a calculation of the control angle θ including a plus or minus sign is performed in accordance with the fact whether the vehicle 40 has entered the left control area or the right control area.

In step S256, a drive current I is calculated, which drive current I is to be supplied to the motor 36 in response to a magnitude of the control angle θ. Additionally, a direction of the drive current is determined in response to the plus or minus sign of the control angle θ.

In step S258, the process for driving the motor 36, that is, the process for supplying the drive current I to the motor 36 is performed. When the process of step S258 is performed, the motor 36 generates the returning steering torque TM for returning the vehicle 40 to the middle of the lane 48.

In step S260, it is determined whether or not the vehicle 40 has exited the left-side control area 62 or the right-side control area 64. As a result, if it is determined that the vehicle 40 has exited the control areas 62 or 64, the present routine is ended immediately. According to the above-mentioned process, the returning steering torque TM is generated after the vehicle 40 enters one of the control areas 62 and 64, and the returning steering torque TM is canceled immediately after the vehicle 40 has exited the one of the control areas 62 and 64.

In step S260, if it is determined that the vehicle 40 has not exited one of the left-side control area 62 and the right-side control area 64, the process of step S262 is performed next.

In step S262, it is determined whether or not a predetermined time t0 has passed after the vehicle 40 entered the one of the control areas 62 and 64. If it is determined that the predetermined time to has not passed after the vehicle 40 entered the one of the control areas 62 and 64, the process of step S254 is performed again. On the other hand, if it is determined that the predetermined time t0 has passed after the vehicle 40 entered the one of the control areas 62 and 64, the present routine is ended immediately. According to the present routine, when the vehicle 40 entered one of the control areas 62 and 64, the generation of the returning steering torque TM is continued until the predetermined time to has passed and the generation of the returning steering torque TM is stopped immediately after the predetermined time t0 has passed.

Normally, the driver of the vehicle 40 positively returns the vehicle 40 to the middle of the lane 48 after the returning steering torque TM is transmitted to the steering wheel 26 except for a case in which the driver intentionally moves the vehicle 40 to the side area of the lane 48. Accordingly, if it is determined, in step S262, that a duration of the vehicle 40 being maintained in one of the control areas 62 and 64 reaches the predetermined time t0, it can be determined that the driver is intentionally moving the vehicle 40 to the side area of the lane 48.

Thus, according to the steering control apparatus of the present embodiment, when the vehicle 40 enters one of the control areas 62 and 64 against the driver's will, deviation of the vehicle 40 from the lane 48 can be positively prevented by generating the returning steering torque TM. Additionally, when the driver intentionally moves the vehicle 40 to the side area of the lane, a good steering characteristic can be achieved by canceling the returning steering torque TM.

It should be noted that, in the above-mentioned embodiment, a "lane area detecting mechanism" is achieved by the ECU 10 recognizing the lane 48 based on data of the white lines 44 and 46 supplied by the image processing unit 14. Additionally, a "returning steering torque generating means" is achieved by the ECU 10 performing the process of steps S252 to S260. Further, an "intention determining means" and a "returning steering torque restricting means" are achieved by the CPU 10 performing the process of step S262.

Additionally, in the above-mentioned embodiment, a "continuous time measuring means" is achieved by the ECU 10 performing the process of step S262.

A description will now be given, with reference to FIGS. 12 and 13, of the seventh embodiment of the present invention. The steering control apparatus according to the seventh embodiment of the present embodiment is achieved by having the ECU perform a control routine shown in FIG. 13 in the system structure shown in FIG. 1.

Figure 12:
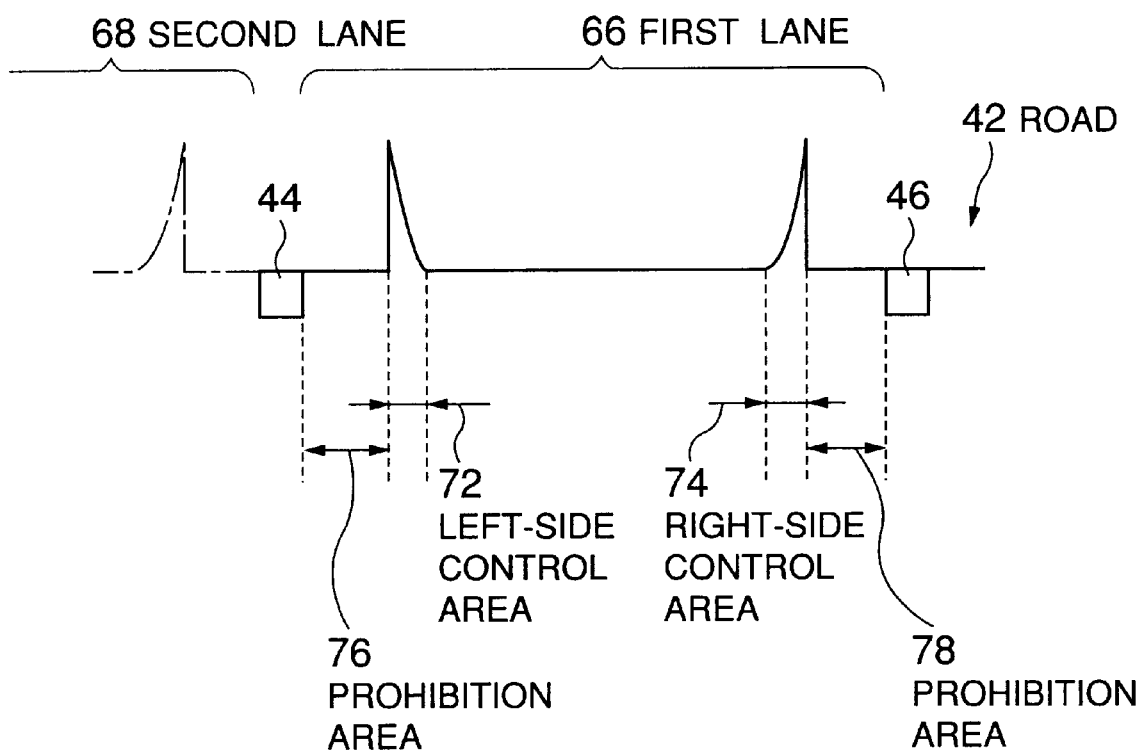
FIG. 12 is an illustration of a virtual cross section of a road for explaining an operation of a steering control apparatus according to a seventh embodiment of the present invention.

FIG. 12 shows a virtual cross section of the road 42 (hereinafter referred to as a virtual cross section (VI)). In FIG. 12, parts that are the same as the parts shown in FIG. 9 are given the same reference numerals, and descriptions thereof will omitted. The steering control apparatus according to the seventh embodiment has a feature in that the vehicle 40 performs a steering characteristic the same as that performed when the vehicle 40 moves on a road having the virtual cross section (VI).

In the present embodiment, the road 42 has a first lane 66 and a second lane 68. The first lane 66 is defined by the white lines 44 and 46. The first lane is separated from the second lane by the white line 44. The first lane 66 is provided with a left-side control area 72 on a side area on the white line 44 side, and is provided with a right-side control area 74 on the white line 46 side. Additionally, a prohibition area 76 is provided between the white line 44 and the left-side control area 72, and a prohibition area 78 is provided between the white line 46 and the right-side control area 74. The second lane 68 is also provided with left-side and right-side control areas and prohibition areas similar to the first lane.

The virtual cross section (VI) is configured so that a middle portion and the prohibition areas 76 and 78 area flat and the control areas 72 and 74 are raised as they approach the respective white lines 44 and 46. A cross-section of the second lane 68 has the same configuration as the cross-section of the first lane 66.

A returning steering torque which directs the vehicle 40 toward the middle of the first lane 66 is input to wheels of the vehicle 40 moving on a road having the virtual cross section (VI) when the vehicle 40 enters one of the left-side control area 72 and the right-side control area 74. The thus-generated returning steering torque is canceled when the vehicle 40 enters the prohibition area 76 from the left-side control area 72 or when the vehicle 40 enters the prohibiting area 76 from the right-side control area 74. Accordingly, after the driver of the vehicle 40 moves the vehicle 40 to one of the prohibition areas 76 and 78 by resisting the returning steering torque, a normal steering operation is performed in the vehicle 40.

The vehicle 40 moving on the road having the virtual cross section (VI) can be more easily deviated outwardly from the left-side control area 72 or the right-side control area 74 as a width of the control area 72 or 74 is decreased. The width of each of the control areas 72 and 74 is set to be smaller than the width of each of the control areas 62 and 64 of the sixth embodiment. Accordingly, the vehicle 40 moving on the road having the virtual cross section (VI) can easily exit the control area 72 or 74 outwardly.

In the virtual cross section (III) shown in FIG. 9, the left-side and right-side control areas 62 and 64 are provided adjacent to the respective white lines 44 and 46. If such a construction is adopted to a road having a plurality of lanes, a control area of one lane is adjacent to a control area of the adjacent lane.

If control areas of the different lanes are adjacent to each other, a vehicle exiting from one control area immediately enters another control area of the adjacent lane. A direction of the returning torque generated in one control area is opposite to a direction of the returning steering torque generated in another control area adjacent to the one control area. Accordingly, when a vehicle moves from one control area to another control area as mentioned above, a large change is generated in the returning steering torque.

However, the virtual cross section (VI) is provided with the prohibition areas 76 and 78 on the outer side of each of the control areas 72 and 74. In the prohibition areas 76 and 78, a returning steering torque is not generated and transmitted to the wheels to be steered. Accordingly, in the vehicle moving on the road having the virtual cross section (VI), there is no large change in the returning steering torque when the vehicle exits one control area.

Figure 13:
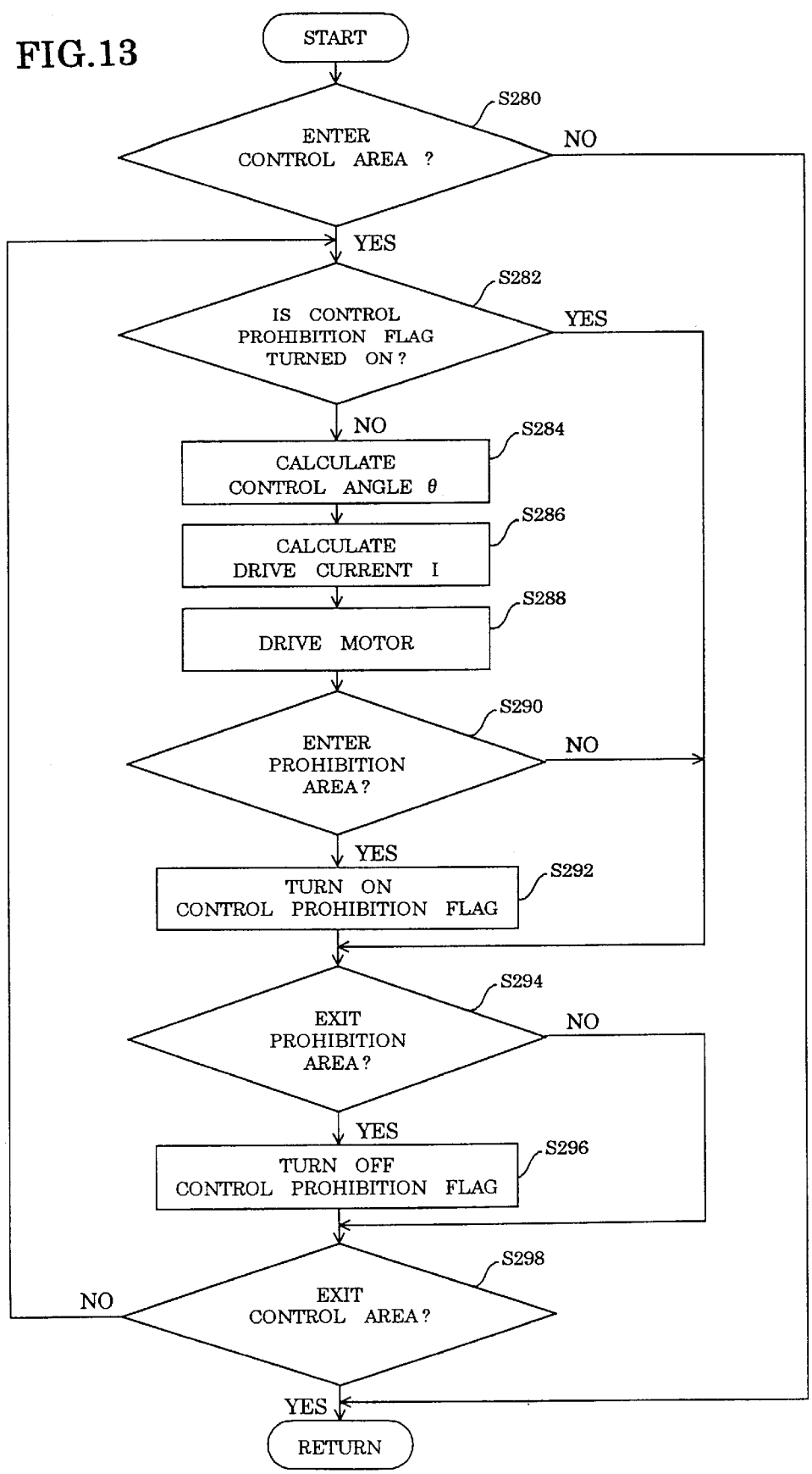
FIG. 13 is a flowchart of a control routine performed by the steering control apparatus according to the seventh embodiment.

FIG. 13 is a flowchart of an example of a control routine performed by the ECU 10 so as to achieve a steering characteristic the same as that of a vehicle moving on the road having the virtual cross section (VI). The routine shown in FIG. 13 is repeatedly started every time the process of the routine is completed. When the routine shown in FIG. 13 is started, the process of step S280 is performed.

In step S280, it is determined whether or not the vehicle 40 has entered one of the left-side and right-side control areas 72 and 74 during a period from the immediately preceding cycle to the present cycle. In step S280, it is determined that the above-mentioned condition is established when the vehicle 40 has entered one of the control areas 72 and 74 from the inner side of each of the lanes 66 and 68. If it is determined that the vehicle 40 has not entered one of the control areas 72 and 74, the present routine is ended without performing any process. On the other hand, if it is determined that the vehicle 40 has entered one of the control areas 72 and 74, the process of step S282 is performed next.

In step S282, it is determined whether or not a control prohibition flag is turned on. The control prohibition flag is turned on when the vehicle 40 enters one of the prohibition areas 76 and 78. If it is determined, in step S282, that the control prohibition flag is turned on, steps S284 to S292 are skipped and the process of step S294 is performed.

In step S284, a control angle θ including a plus or minus sign is calculated. The control angle θ is an angle which should be provided to the steering shaft 28 so that the assumed moving line of the vehicle 40 matches the center of the lane 48.

In step S286, a drive current I is calculated which is to be supplied to the motor 36 in response to a magnitude of the control angle θ.

In step S288, the process for driving the motor 36 by the drive current I is performed. When the process of step S288 is performed, the motor 36 generates the returning steering torque TM when the control prohibition flag is turned off after the vehicle 40 has entered one of the control areas 72 and 74.

In step S290, it is determined whether or not the vehicle 40 has entered one of the prohibition areas 76 and 78 during a period from the immediately preceding cycle to the present cycle. As a result, if it is determined that the vehicle 40 has entered one of the prohibition areas 76 and 78, the process of step S292 is performed next.

In step S292, the control prohibition flag is turned on. If the process of step S292 Is performed, it is determined, in step S282 of the subsequent cycle that the prohibition flag is turned on. According to the above-mentioned process, the generation of the returning steering torque TM can be prohibited after the vehicle 40 enters one of the prohibition areas 76 and 78.

In step 294, it is determined whether or not the vehicle 40 has exited one of the prohibition areas 76 and 78. As a result, if it is determined that the vehicle 40 has exited one of the prohibition areas 76 and 78, the process of step S296 is performed. On the other hand, if it is determined that the above-mentioned condition is not established, step S296 is skipped and the process of step S298 is performed.

In step S296, the control prohibition flag is reset to an off-state. When the process of step S296 is performed, it is determined, in step S282 of the subsequent cycle, that the control prohibition flag is turned off. Thus, according to the above-mentioned process, a condition, in which the returning steering torque TM can be generated after the vehicle 40 exits one of the prohibition areas 76 and 78, can be rapidly established.

In step S298, it is determined whether or not the vehicle 40 has exited one of the control areas 72 and 74. In step S298, it is determined that the above-mentioned condition is established when the vehicle 40 has exited one of the left-side and right-side control areas 72 and 74 toward the inner side of each of the lanes during a period from the immediately preceding cycle to the present cycle. If it is determined that the vehicle 40 has not exited the control areas 72 or 74, the process of step S282 and subsequent steps are performed again. On the other hand, if it is determined that the vehicle 40 as exited one of the control areas 72 and 74, the present routine is ended immediately.

As mentioned above, according to the steering control apparatus of the present invention, the following functions can be achieved:

1) generating an appropriate returning steering torque TM when the vehicle 40 is shifted from a middle of the lane to a side area of the lane;
2) relatively easily exiting the vehicle 40 outwardly from one of the control areas 72 and 74 when the driver intentionally moves the vehicle 40 to the side area of the lane after the returning steering torque TM is generated; and
3) prohibiting the generation of the returning steering torque TM by the motor 36 when the vehicle is moved outside of one of the control areas 72 and 74, that is, when the vehicle 40 is moved to one of the prohibition areas 76 and 78, without being influenced by the adjacent lane.

Thus, according to the steering control apparatus of the present embodiment, when the driver of he vehicle 40 does not intend to move the vehicle 40 to a side area of the lane, deviation of the vehicle from the lane can be effectively prevented. Additionally, when the driver intentionally moves the vehicle 40 to the side area of the lane, a good steering characteristic can be achieved.

It should be noted that, in the above-mentioned embodiment, a "lane area detecting mechanism" is achieved by the ECU 10 recognizing the lane 48 based on data of the white lines 44 and 46 supplied by the image processing unit 14. Additionally, a "returning steering torque generating means" is achieved by the ECU 10 performing the process of steps S280 to S288. Further, an "intention determining means" is achieved by the ECU 10 performing the process of step S290. A "returning steering torque restricting means" is achieved by the ECU 10 performing the process of steps S282 and S292.

Additionally, in the above-mentioned embodiment, a "prohibition condition determining means" is achieved by the ECU 10 performing the process of step S290, and a "second prohibiting means" is achieved by the ECU 10 performing the process of step S292.

A description will now be given, with reference to FIGS. 14 and 15, of the eighth embodiment of the present invention. The steering control apparatus according to the eighth embodiment of the present embodiment is achieved by having the ECU perform a control routine shown in FIG. 15 in the system structure shown in FIG. 1.

Figure 14:
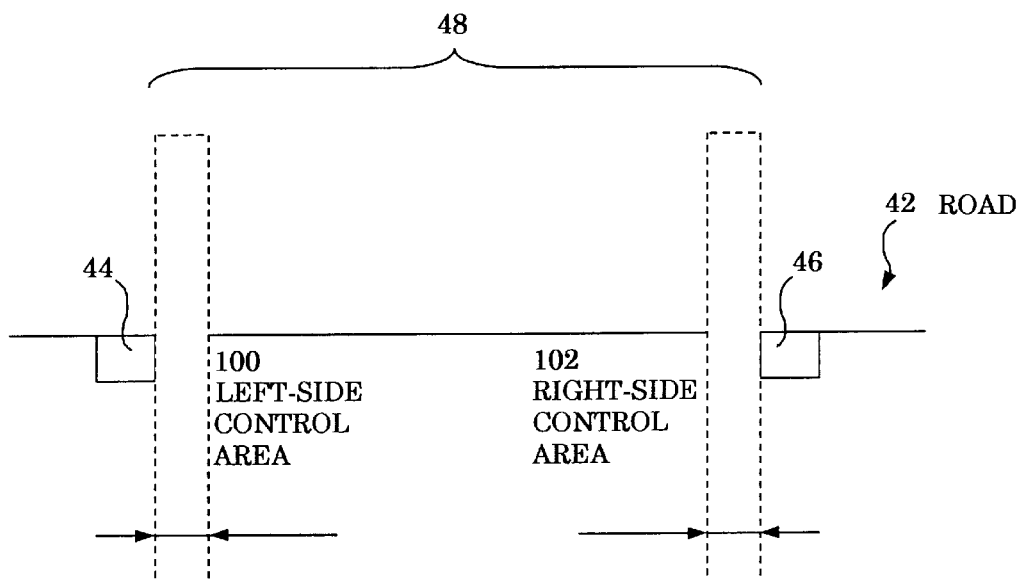
FIG. 14 is an illustration of a virtual cross section of a road for explaining an operation of a steering control apparatus according to an eighth embodiment of the present invention.

FIG. 14 shows a virtual cross section of the road 42 (hereinafter referred to as a virtual cross section (VIII)). In FIG. 14, parts that are the same as the parts shown in FIG. 9 are given the same reference numerals, and descriptions thereof will omitted. The steering control apparatus according to the eighth embodiment has a feature in that the vehicle 40 performs a steering characteristics the same as that performed when the vehicle 40 moves on a road having the virtual cross-section (VIII).

The virtual cross-section (VIII) is provided with a left-side control area 100 and a right-side control area 102 inside the white lines 44 and 46, respectively. In the virtual cross section (VIII), when the vehicle 40 enters one of the control areas 100 and 102, the one of the control areas 100 and 102 is raised for a predetermined time period t1.

When the configuration of the virtual cross section (VIII) is changed as mentioned above, a returning steering torque toward the middle of the lane 48 is generated and applied to wheels of a vehicle for the predetermined time period t1 after the vehicle enters one of the control areas 100 and 102.

Figure 15:
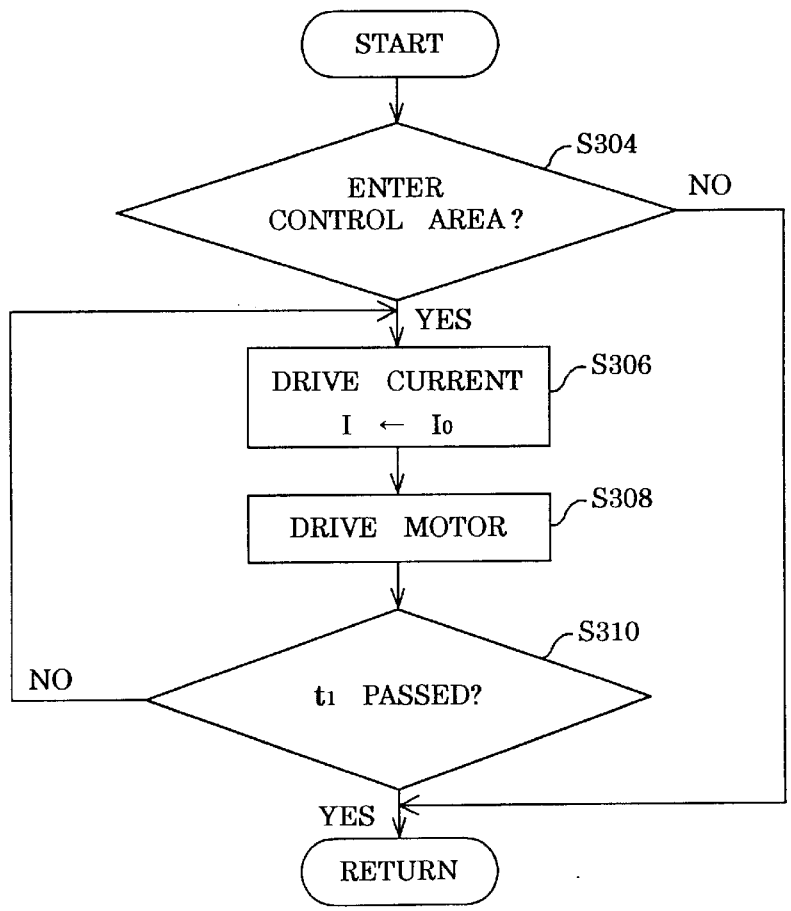
FIG. 15 is a flowchart of a control routine performed by the steering control apparatus according to the eighth embodiment.

FIG. 15 is a flowchart of an example of a control routine performed by the ECU 10 so as to achieve a steering characteristic the same as that of a vehicle moving on the road having the virtual cross section (VIII). The routine shown in FIG. 15 is repeatedly started every time the process of the routine is completed. When the routine shown in FIG. 15 is started, the process of step S304 is performed.

In step S304, it is determined whether or not the vehicle 40 has entered one of the left-side and right-side control areas 100 and 102 during a period from the immediately preceding cycle to the present cycle. In step S304, if it is determined that the vehicle 40 has not entered one of the control areas 100 and 102, the present routine is ended without performing any process. On the other hand, if it is determined that the vehicle 40 has entered one of the control areas 100 and 102, the process of step S306 is performed next.

In step S306, a drive current I supplied to the motor 36 is set to a predetermined value I0. The predetermined value I0 is for rotating the steering shaft by an appropriate control angle θ.

In step S308, a process for driving the motor 36 is performed by using the above-mentioned drive current I0. When the process of step S308 is performed, a returning steering torque corresponding to the drive current Io is transmitted to the driver via the steering wheel 26.

In step S310, it is determined whether or not the predetermined time period t1 (for example, 0.5 sec) has passed after an operation of the motor 36 was started. As a result, if it is determined that the predetermined time period t1 has not passed yet, the process of step S306 is performed again. On the other hand, if it is determined that the predetermined time period t1 has passed, the present routine is ended immediately.

According to the above-mentioned process, the driver of the vehicle 40 is informed that the vehicle 40 is located in a side area of the lane 48 by generating the returning steering torque TM for a predetermined time period t1 after the vehicle 40 has entered one of the control areas 100 and 102. Thus, the driver moves the vehicle 40 back to the middle of the lane 48 when the driver feels the returning steering torque TM except for a case in which the driver is intentionally moving the vehicle 40 to the side area of the lane 48.

Thus, according to the steering control apparatus of the present embodiment, when the driver of the vehicle 40 does not intend to move the vehicle 40 to a side area of the lane, deviation of the vehicle from the lane can be effectively prevented. Additionally, when the driver intentionally moves the vehicle 40 to the side area of the lane 48, a good steering characteristic can be achieved.

It should be noted that, in the above-mentioned embodiment, a "lane area detecting mechanism" is achieved by the ECU 10 recognizing the lane 48 based on data of the white lines 44 and 46 supplied by the image processing unit 14. Additionally, a "returning steering torque generating means" is achieved by the ECU 10 performing the process of steps S304 to S310.

A description will now be given, with reference to FIGS. 16 and 17, of the ninth embodiment of the present invention. The steering control apparatus according to the ninth embodiment of the present embodiment is achieved by having the ECU 10 perform a control routine shown in FIG. 17 in the system structure shown in FIG. 1.

Figure 16:
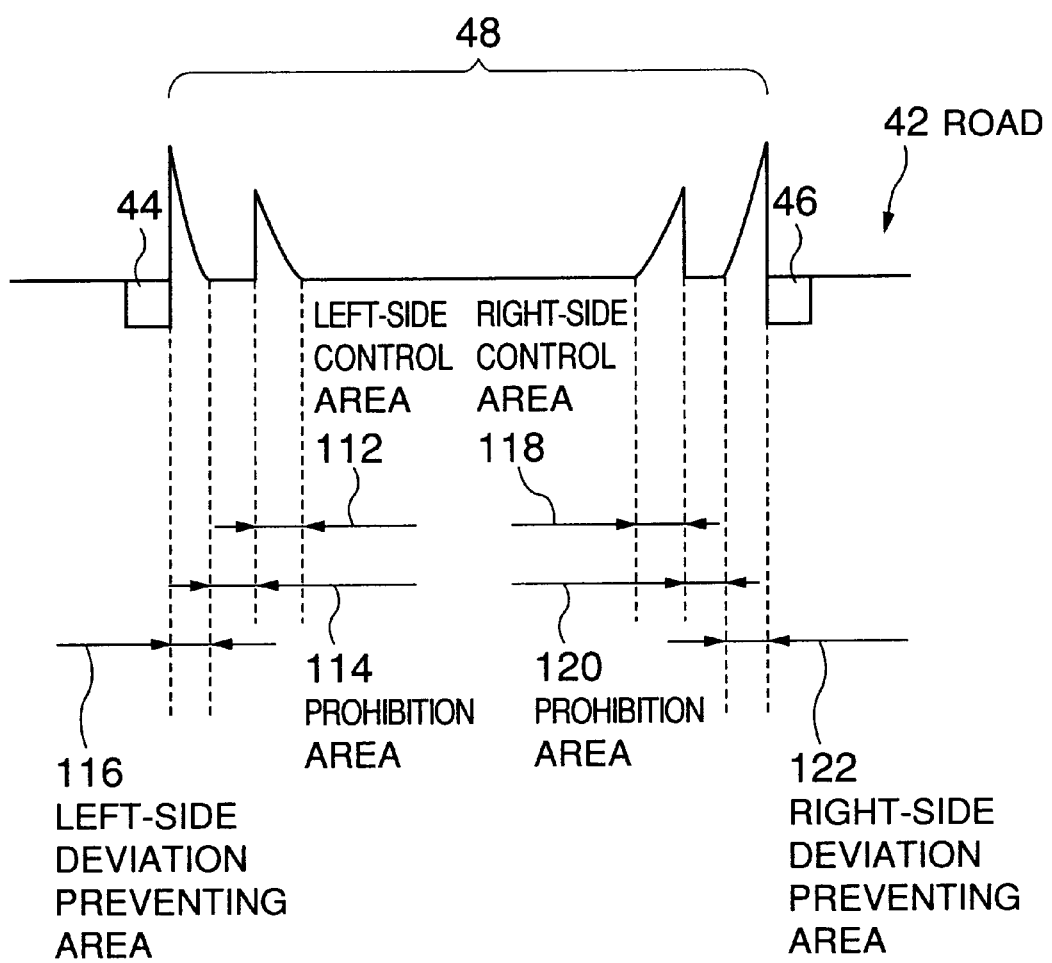
FIG. 16 is an illustration of a virtual cross section of a road for explaining an operation of a steering control apparatus according to a ninth embodiment of the present invention.

FIG. 16 shows a virtual cross section of the road 42 (hereinafter referred to as a virtual cross-section (X)). In FIG. 16, parts that are the same as the parts shown in FIG. 9 are given the same reference numerals, and descriptions thereof will omitted. The steering control apparatus according to the ninth embodiment has a feature in that the vehicle 40 performs steering characteristics the same as that performed when the vehicle 40 moves on a road having the virtual cross section (X).

The virtual cross section (X) is provided with a left-side control area 112, a prohibition area 114 and a left-side deviation preventing area 116, in that order, in a side area adjacent to the white line 44. Additionally, a right-side control area 118, a prohibition area 120 and a right-side deviation preventing area 122 are provided, in that order, in a side area adjacent to the white line 46. The virtual cross-section (X) is configured so that a middle of the lane 48 and the prohibition areas 114 and 118 are flat. Each of the left-side control area 112, the left-side deviation preventing area 116, the right-side control area 118 and the right-side deviation preventing area 122 is raised higher as it approaches the respective white lines 44 and 46.

A returning steering torque which directs the vehicle 40 toward the middle of the lane 48 is applied to wheels of the vehicle 40 moving on the road having the virtual cross section (X) after the vehicle 40 enters the left-side control area 112 or the right-side control area 120. The thus-generated returning steering torque is canceled when the vehicle 40 enters the prohibition area 114 from the left-side control area 112 or enters the prohibition area 120 from the right-side control area 118. Accordingly, if the driver of the vehicle 40 intentionally moves the vehicle 40 to the prohibition area 114 or 120 by resisting the returning steering torque, a normal steering operation can be performed after the vehicle 40 enters the prohibition area 114 or 120.

A width of each of the control areas 112 and 118 is set to be relatively small similar to the control areas 72 and 74 of the virtual cross section (VI). Accordingly, in the vehicle 40 moving the road having the virtual cross section (X), a good steering characteristic can be easily achieved in a side area of the lane 48 by an intentional operation of the driver.

When the vehicle 40 moving on the road having the virtual cross section (X) moves further outwardly from the prohibition area 114 or 120 and enters the left-side deviation prohibiting area 116 or the right-side deviation prohibiting area 122, a returning steering torque which moves the vehicle 40 toward the middle of the lane 48 is generated again and applied to the wheels of the vehicle 40 to be steered. The left-side and right-side deviation preventing areas 116 and 122 are provided on a boundary of the lane 48. Thus, the vehicle 40 moving on the road having the virtual cross section (X) is prevented from being deviated from the lane 48 while a good steering characteristic can be achieved for moving a side area of the lane 48.

Figure 17:
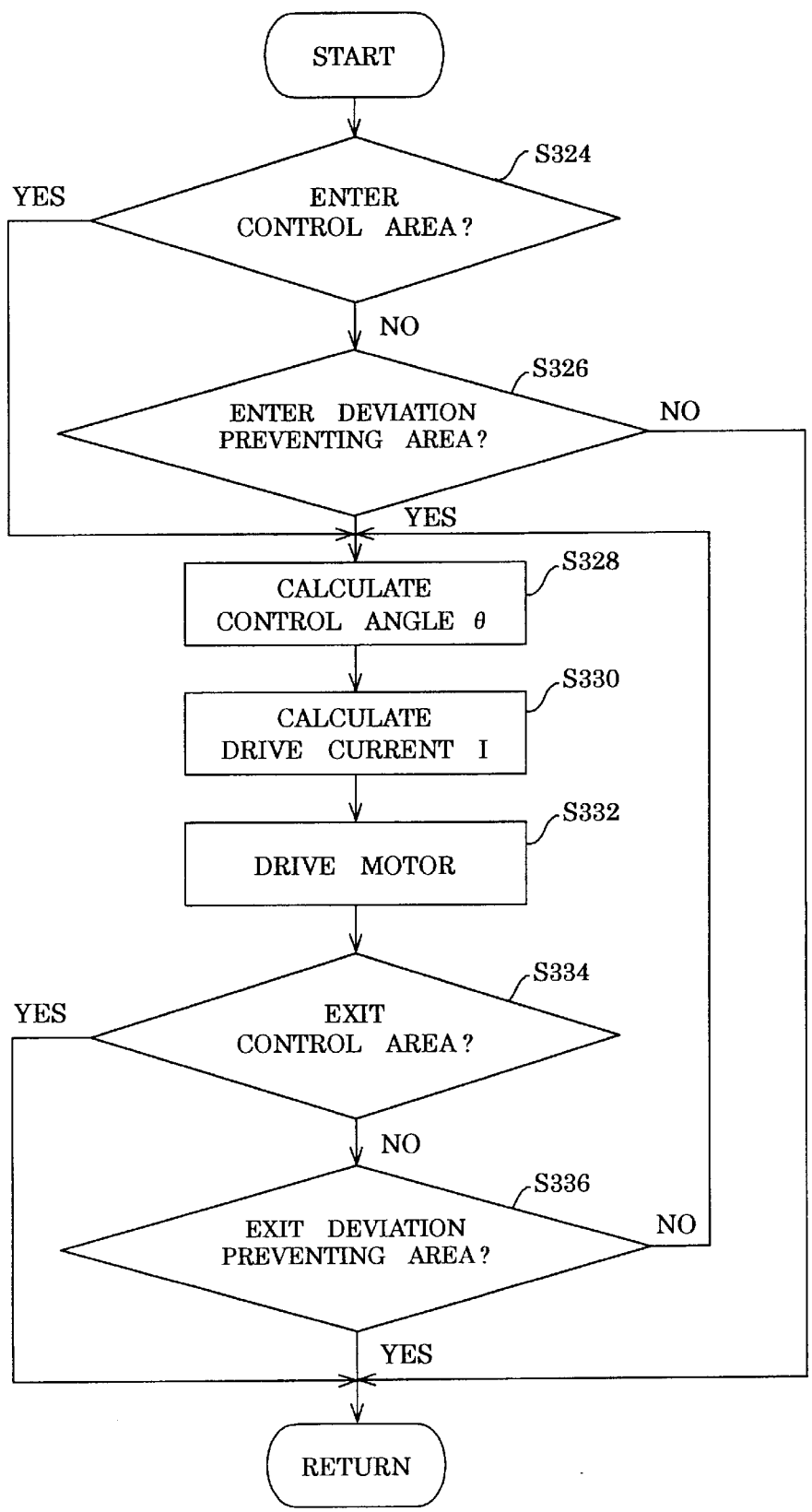
FIG. 17 is a flowchart of a control routine performed by the steering control apparatus according to the ninth embodiment.

FIG. 17 is a flowchart of an example of a control routine performed by the ECU 10 so as to achieve a steering characteristic the same as that of a vehicle moving on the road having the virtual cross section (X). The routine shown in FIG. 17 is repeatedly started every time the process of the routine is completed. When the routine shown in FIG. 17 is started, the process of step S324 is performed.

In step S324, it is determined whether or not the vehicle 40 has entered one of the left-side and right-side control areas 112 and 118 during a period from the immediately preceding cycle to the present cycle. In step S324, it is determined that the above-mentioned condition is established when the vehicle 40 enters one of the control areas 112 and 118 from the inner side of the lane 48. In step S324, if it is determined that the vehicle 40 has not entered one of the control areas 112 and 118, the process of step S326 is performed next. On the other hand, if it is determined that the vehicle 40 has entered one of the control areas 112 and 118, step S326 is skipped and the process of step S328 is performed.

In step S326, it is determined whether or not the vehicle 40 has entered one of the left-side and right-side deviation preventing areas 116 and 122 during a period from the immediately preceding cycle to the present cycle. In step S326, it is determined that the above-mentioned condition is established when the vehicle 40 enters one of the deviation preventing areas 116 and 122 from the inner side of the lane 48. In step S326, if it is determined that the vehicle 40 has not entered one of the deviation preventing areas 116 and 122, the present routine is ended without performing any process. On the other hand, if it is determined that the vehicle 40 has entered one of the deviation preventing areas 116 and 122, the process of step S328 is performed next.

In step S328, a magnitude of a control angle θ including a plus or minus sign is calculated. The control angle θ is a steering angle which is to be provided to the steering shaft 28 for returning the vehicle 40 in the deviation preventing area 116 or 122 to the middle of the lane 48.

In step S330, a magnitude and a direction of a drive current I corresponding to the control angle θ is calculated.

In step S332, a process for driving the motor 36 is performed by using the above-mentioned drive current I. When the process of step S332 is performed, a returning steering torque TM corresponding to the drive current I can be generated after the vehicle 40 enters one of the control areas 112 and 114 and the deviation preventing areas 116 and 122.

In step S334, it is determined whether or not the vehicle 40 has exited one of the control areas 112 and 118. In step S334, it is determined that the above-mentioned condition is established when the vehicle 40 exits one of the control areas 112 and 118 toward the inner side of the lane 48 or exits to one of the prohibition areas 114 and 120 during a period from the immediately preceding cycle to the present cycle.

In step S334, if it is determined that the vehicle 40 has not exited one of the control areas 112 and 118, the process of step S336 is performed next. On the other hand, if it is determined that the vehicle 40 has exited one of the control areas 112 and 118, the present routine is ended immediately.

In step S336, it is determined whether or not the vehicle 40 has exited one of the left-side and right-side deviation preventing areas 116 and 122 during a period from the immediately preceding cycle to the present cycle. If it is determined that the vehicle 40 has not exited one of the deviation preventing areas 116 and 122, the process of step S328 and subsequent steps is performed again. On the other hand, if it is determined that the vehicle 40 has exited one of the deviation preventing areas 116 and 122, the present routine is ended immediately.

According to the above-mentioned process, the returning steering torque TM can be generated after the vehicle 40 enters one of the control areas 112 and 118 and the deviation preventing areas 116 and 122 and until the vehicle 40 exits therefrom. Additionally, the returning steering torque TM can be canceled immediately after the vehicle 40 exits those areas.

As mentioned above, according to the routine shown in FIG. 17, the following functions can be achieved:

1) generating an appropriate returning steering torque TM when the vehicle 40 is shifted from a middle of the lane to a side area of the lane;

2) relatively easily exiting the vehicle 40 outwardly from one of the control areas 112 and 118 when the driver intentionally moves the vehicle 40 to the side area of the lane after the returning steering torque TM is generated; and 3) generating the returning steering torque TM again when the vehicle moves to a boundary of the lane 48.

Thus, according to the steering control apparatus of the present embodiment, when the driver of he vehicle 40 does not intend to move the vehicle 40 to a side area of the lane, deviation of the vehicle from the lane can be effectively prevented. Additionally, when the driver intentionally moves the vehicle 40 to the side area of the lane, a good steering characteristic can be achieved. Further, the vehicle 40 is effectively prevented from deviating from the lane 48 when the driver intentionally moves the vehicle 40 to a side area of the lane 48.

It should be noted that, in the above-mentioned embodiment, a "lane area detecting mechanism" is achieved by the ECU 10 recognizing the lane 48 based on data of the white lines 44 and 46 supplied by the image processing unit 14. Additionally, a "returning steering torque generating means" is achieved by the ECU 10 performing the process of steps S324 and S328 to S332. Further, an "intention determining means" and a "returning steering torque restricting means" are achieved by the ECU 10 performing the process of step S334.

Additionally, in the above-mentioned embodiment, a "prohibition condition determining means" and a "second prohibiting means" are achieved by the ECU 10 performing the process of step S334.

Further, a "deviation preventing means" is achieved by the ECU 10 performing the process of steps S326 to S332 and S336.

A description will now be given, with reference to FIGS. 18 and 19, of the tenth embodiment of the present invention. The steering control apparatus according to the tenth embodiment of the present embodiment is achieved by having the ECU 10 perform a control routine shown in FIG. 19 in the system structure shown in FIG. 1.

Figure 18:
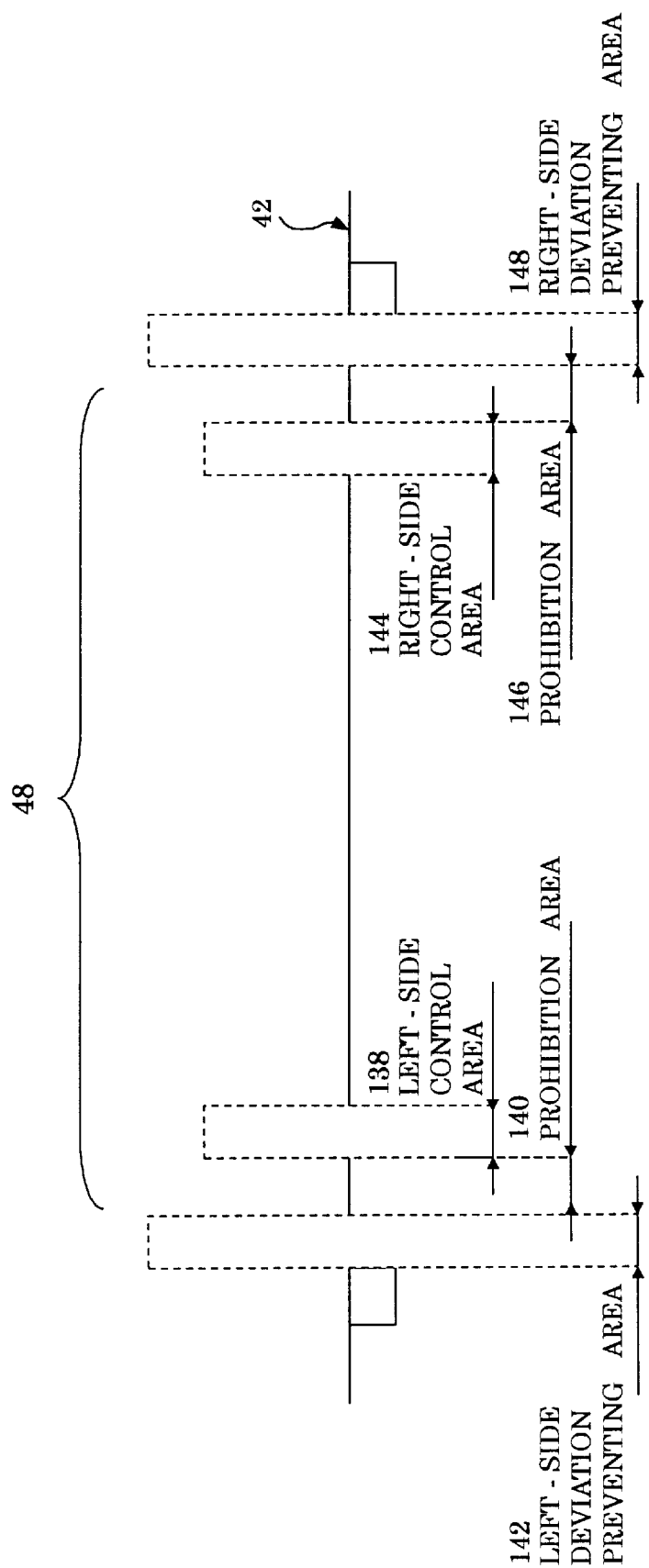
FIG. 18 is an illustration of a virtual cross section of a road for explaining an operation of a steering control apparatus according to a tenth embodiment of the present invention.

FIG. 18 shows a virtual cross section of the road 42 (hereinafter referred to as a virtual cross section (XII)). In FIG. 18, parts that are the same as the parts shown in FIG. 9 are given the same reference numerals, and descriptions thereof will omitted. The steering control apparatus according to the tenth embodiment has a feature in that the vehicle 40 performs steering characteristics the same as that performed when the vehicle 40 moves on a road having the virtual cross section (XII).

The virtual cross section (XII) is provided with a left-side control area 138, a prohibition area 140 and a left-side deviation preventing area 142, in that order, in a side area adjacent to the white line 44. Additionally, a right-side control area 144, a prohibition area 146 and a right-side deviation preventing area 148 are provided, in that order, in a side area adjacent to the white line 46. Each of the control areas 138 and 144 and the deviation preventing areas 142 and 148 are raised for a predetermined period t2 after the vehicle 40 enters one of the areas 138, 142, 144 and 148.

When the configuration of the virtual cross section (XII) is changed as mentioned above, a returning steering torque toward the middle of the lane 48 is generated and applied to wheels of a vehicle for the predetermined period t2 after the vehicle enters one of the control areas 138 and 144 and the deviation preventing areas 142 and 148.

Figure 19:
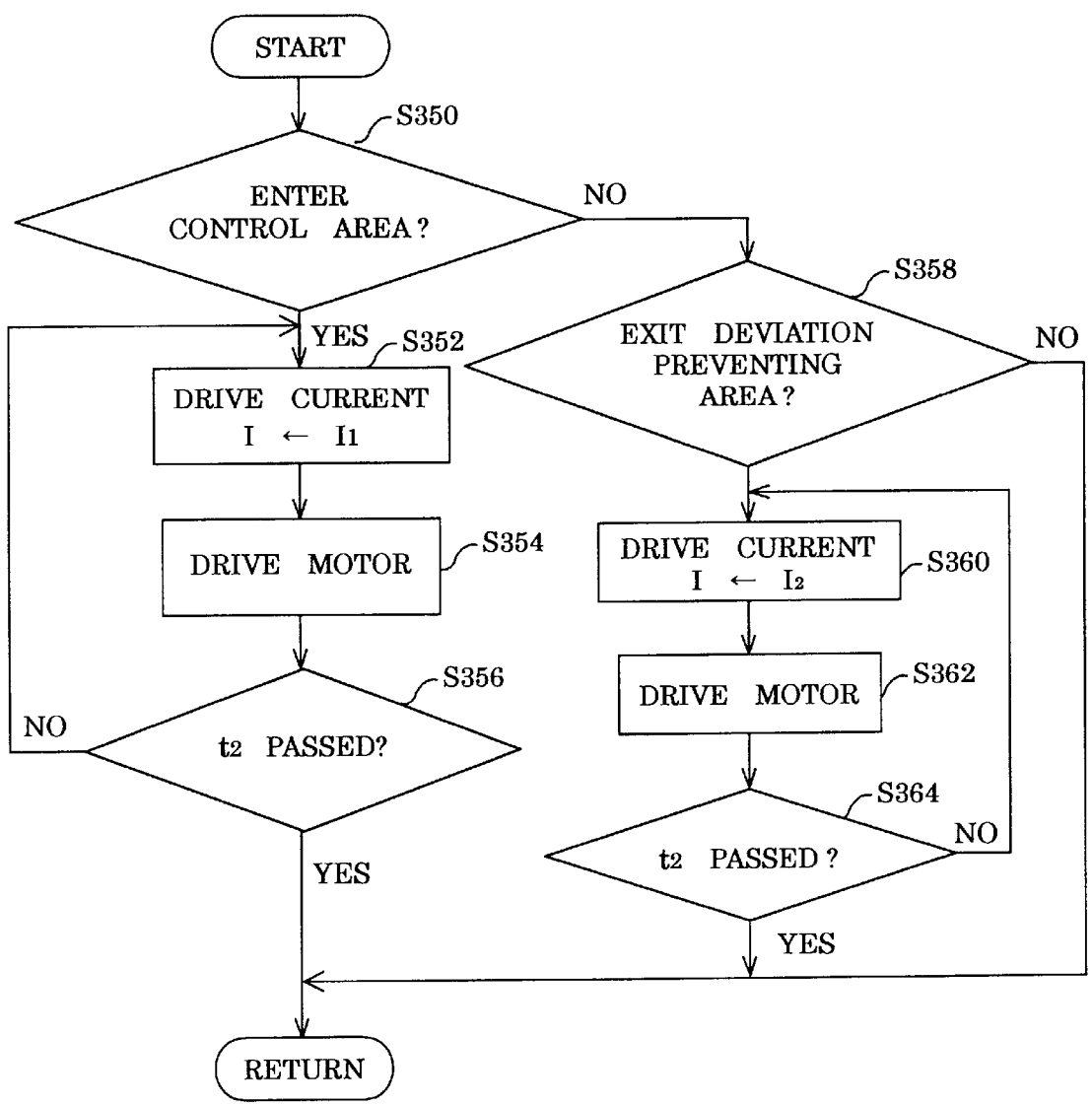
FIG. 19 is a flowchart of a control routine performed by the steering control apparatus according to the tenth embodiment.

FIG. 19 is a flowchart of an example of a control routine performed by the ECU 10 so as to achieve a steering characteristic the same as that of a vehicle moving on the road having the virtual cross section (XII). The routine shown in FIG. 19 is repeatedly started every time the process of the routine is completed. When the routine shown in FIG. 19 is started, the process of step S350 Is performed.

In step S350, it is determined whether or not the vehicle 40 has entered one of the left-side and right-side control areas 138 and 144 during a period from the immediately preceding cycle to the present cycle. If it is determined, in step S350, that the vehicle 40 has entered one of the control areas 138 and 144, the process of step S352 is performed next.

In step S352, a drive current I supplied to the motor 36 is set to a predetermined value I1.

In step S354, a process for driving the motor 36 is performed by using the above-mentioned drive current I1. When the process of step S354 is performed, a returning steering torque TM corresponding to the drive current I1 is transmitted to the driver via the steering wheel 26.

In step S356, it is determined whether or not the predetermined period t2 (for example, 0.5 sec) has passed after an operation of the motor 36 was started. As a result, if it is determined that the predetermined time period t2 has not passed yet, the process of step S352 is performed again. On the other hand, if it is determined that the predetermined time period t2 has passed, the present routine is ended immediately.

According to the above-mentioned process, the driver of the vehicle 40 is informed that the vehicle 40 is located in a side area of the lane 48 by generating the returning steering torque TM for the predetermined period t2 after the vehicle 40 has entered one of the control areas 138 and 144. Thus, the driver moves the vehicle 40 back to the middle of the lane 48 when the driver feels the returning steering torque TM except for a case in which the driver is intentionally moving the vehicle 40 to the side area of the lane 48. Thus, according to the steering control apparatus of the present embodiment, when the driver of the vehicle 40 does not intend to move the vehicle 40 to a side area of the lane, the vehicle 40 is effectively prevented from being greatly deviated from the middle of the lane 48.

If it is determined, in step S350, that the vehicle 40 has not entered any one of the control areas 138 and 144, the process of step S358 is performed.

In step S358, it is determined whether or not the vehicle 40 has entered one of the left-side and right-side deviation preventing areas 142 and 148 during a period from the immediately preceding cycle to the present cycle. If it is determined, in step S358, that the vehicle 40 has not entered any one of the deviation preventing areas 142 and 148, the routine is ended without performing any process. On the other hand, it is determined that the vehicle 40 has entered one of the deviation preventing areas 142 and 148, the process of step S360 is performed next.

In step S360, the drive current I supplied to the motor 36 is set to a predetermined value I2.

In step S362, a process for driving the motor 36 is performed by using the above-mentioned drive current I2. When the process of step S362 is performed, a returning steering torque TM corresponding to the drive current I2 is transmitted to the driver via the steering wheel 26.

In step S364, it is determined whether or not the predetermined period t2 has passed after an operation of the motor 36 was started. As a result, if it is determined that the predetermined period t2 has not passed yet, the process of step S360 is performed again. On the other hand, if it is determined that the predetermined time period t2 has passed, the present routine is ended immediately.

According to the above-mentioned process, the driver of the vehicle 40 is informed that the vehicle 40 is located in a border of the lane 48 by generating the returning steering torque TM for the predetermined period t2 after the vehicle 40 has entered one of the deviation preventing areas 142 and 148. Thus, when the returning steering torque TM is generated as mentioned above, the driver's attention can be attracted with respect to the fact that the vehicle 40 is being deviated from the lane 48.

Additionally, a period for generating the returning steering torque TM is restricted to the predetermined short period t2. Accordingly, when the driver intentionally moves the vehicle 40 to a side area of the lane 48, a steering effort can be performed without being strongly influenced by the returning steering torque TM.

Thus, according to the steering control apparatus of the present embodiment, when the driver of the vehicle 40 does not intend to move the vehicle 40 to a side area of the lane, deviation of the vehicle from the lane 48 can be effectively prevented. Additionally, when the driver intentionally moves the vehicle 40 to the side area of the lane 48, a good steering characteristic can be achieved. Further, when the driver intentionally moves the vehicle 40 to the boarder of the lane 48, the driver's attention can be effectively attracted.

It should be noted that, in the above-mentioned embodiment, a "lane area detecting mechanism" is achieved by the ECU 10 recognizing the lane 48 based on data of the white lines 44 and 46 supplied by the image processing unit 14. Additionally, a "returning steering torque generating means" is achieved by the ECU 10 performing the process of steps S350 to S356.

Additionally, a "deviation preventing means" is achieved by the ECU 10 performing the process of steps S358 to S364.

Figure 20:
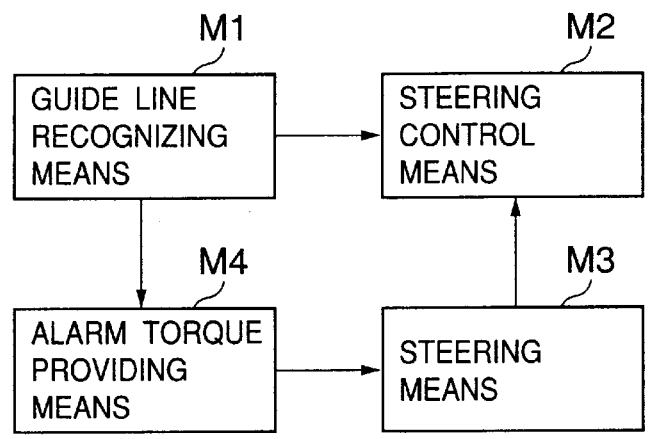
FIG. 20 is a block diagram for explaining a basic operation of a vehicle steering control apparatus according to an eleventh embodiment of the present invention.

A description will now be given of an eleventh embodiment of the present invention. FIG. 20 is a block diagram of a vehicle steering control apparatus for explaining a basic structure of a vehicle steering control apparatus according to the eleventh embodiment of the present invention.

The steering control apparatus according to the eleventh embodiment comprises, as shown in FIG. 20, a guide line recognizing means M1, a steering control means M2, a steering means M3 and an alarming torque providing means M4. The guide line recognizing means M1 recognizes a guide line on a road on which a vehicle provided with the steering control apparatus is moving. The steering control means detects a positional state of the vehicle with respect to the guide line so as to perform a steering control. The alarming torque providing means M4 provides a torque to the steering means M3 in accordance with the positional state of the vehicle with respect to the guide lines so that the driver of the vehicle can recognize a position of the vehicle with respect to the guide line by the torque provided to the steering means M3.

Figure 21:
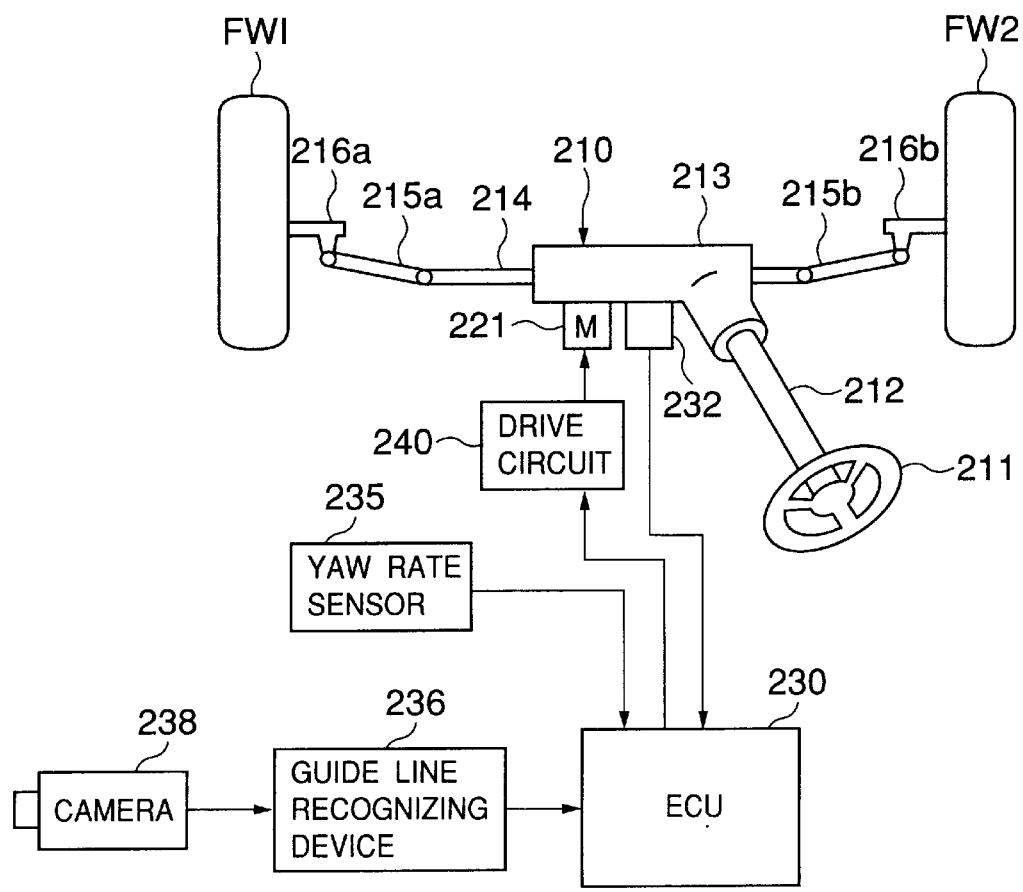
FIG. 21 is a system structure diagram of the vehicle steering control apparatus according to the eleventh embodiment of the present invention.

FIG. 21 is a system structure diagram of the vehicle steering control apparatus according to the eleventh embodiment of the present invention.

In FIG. 21, the steering control apparatus comprises a guide line recognizing device 236 as the guide line recognizing means M1, a front wheel steering mechanism 210 as the steering means M3 and an electronic control unit (ECU) 230.

The front steering wheel mechanism 210 includes a steering wheel 211 connected to a pinion gear (not shown in the figure) provided in a steering gear box 213 via a steering shaft 212. The pinion gear is engaged with a rack bar 214 so as to convert a rotational motion of the steering wheel 211 into a reciprocal motion of the rack bar 214. Opposite ends of the rack bar 214 are connected to left and right front wheels FW1 and FW2 via left and right tie rods 215a and 215b and left and right knuckle arms 216a and 216b, respectively, so that the left and right front wheels FW1 and FW2 are operated by a steering operation of the steering wheel 211.

The front wheel steering mechanism 210 includes an electric motor 221 (brushless motor) as an actuator for operating the front wheels FW1 and FW2. A rotational shaft of the electric motor 221 is connected to the pinion gear provided in the steering gear box 213.

A front wheel steering angle sensor 232, a yaw rate sensor 235 and the guide line recognizing device 236 are connected to the electronic control unit (ECU) 230. The steering angle sensor 232 as a moving condition detecting means detects a steering angle of the left and right front wheels FW1 and FW2. The yaw rate sensor 235 detects a yaw rate of the vehicle.

Figure 22:
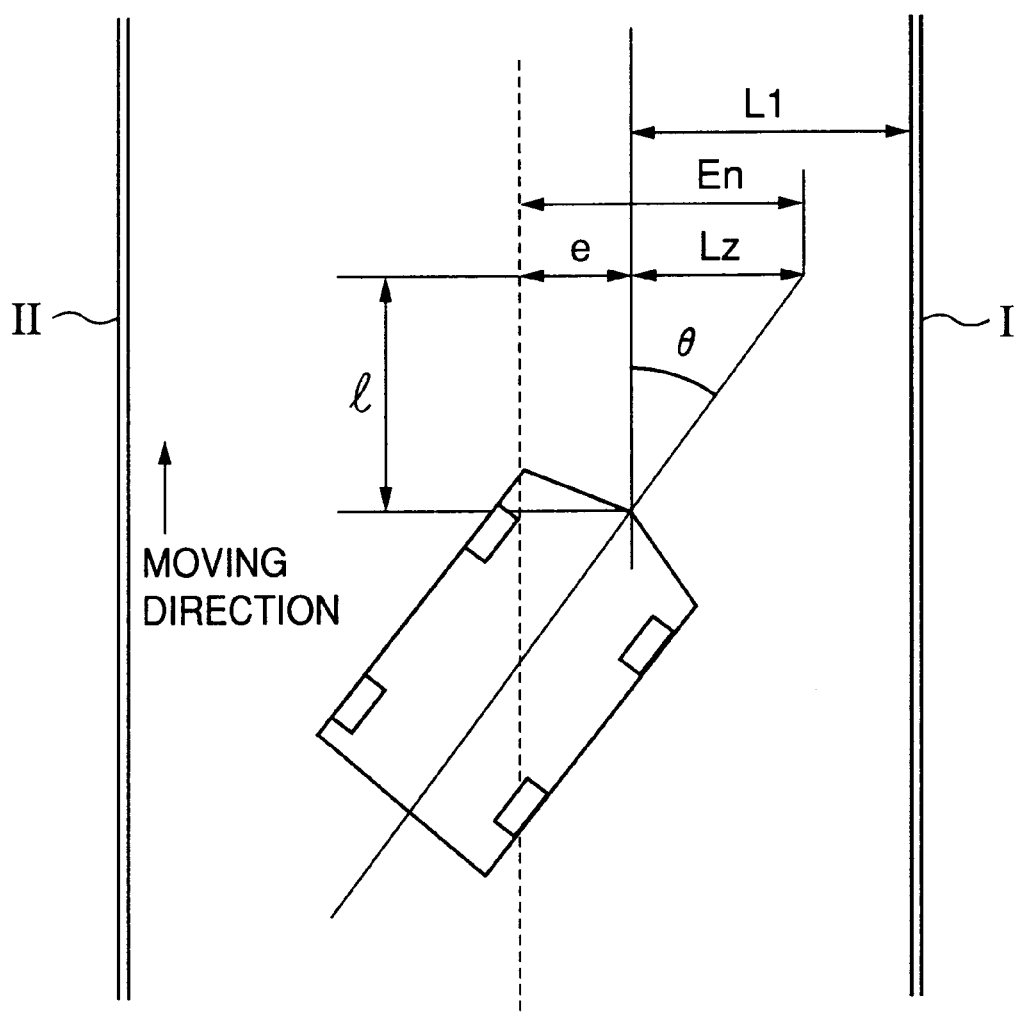
FIG. 22 is an illustration for explaining an offset amount of a vehicle.

The guide line recognizing device 236 is provided with an image of the road in front of the vehicle by a camera 238. The guide line recognizing device 236 processes the image of the road so as to recognize a guide line such as a white line in the middle or side of the road or a yellow line indicating a passing prohibited zone. The guide line recognizing device 236 recognizes a lane on which the vehicle is moving based on the guides in the image of the road. FIG. 22 shows the lane which is defined by the guide lines I and II. Additionally, the guide line recognizing device 236 detects an offset amount E(n) of the vehicle with respect to the center of the moving lane which is indicated by a dotted line in FIG. 22 and also detects a distance L1 between the vehicle and one of the guide lines I and II. Additionally, the guide line recognizing device 236 detects a radius of curvature R of a curve.

The offset amount E(n) is represented by the following relationships (1) and (2), where e is a present offset amount of the vehicle in a transverse direction of the lane; $\theta$ is an inclination angle of the vehicle with respect to the lane which is obtained from the image of the road; Lz is an offset amount of the front viewing point form the current position of the vehicle; and 1 is a front viewing point distance.

$$E(n)=e+Lz \quad (1)$$

$$Lz=1\times\theta \quad (2)$$

Figure 23:
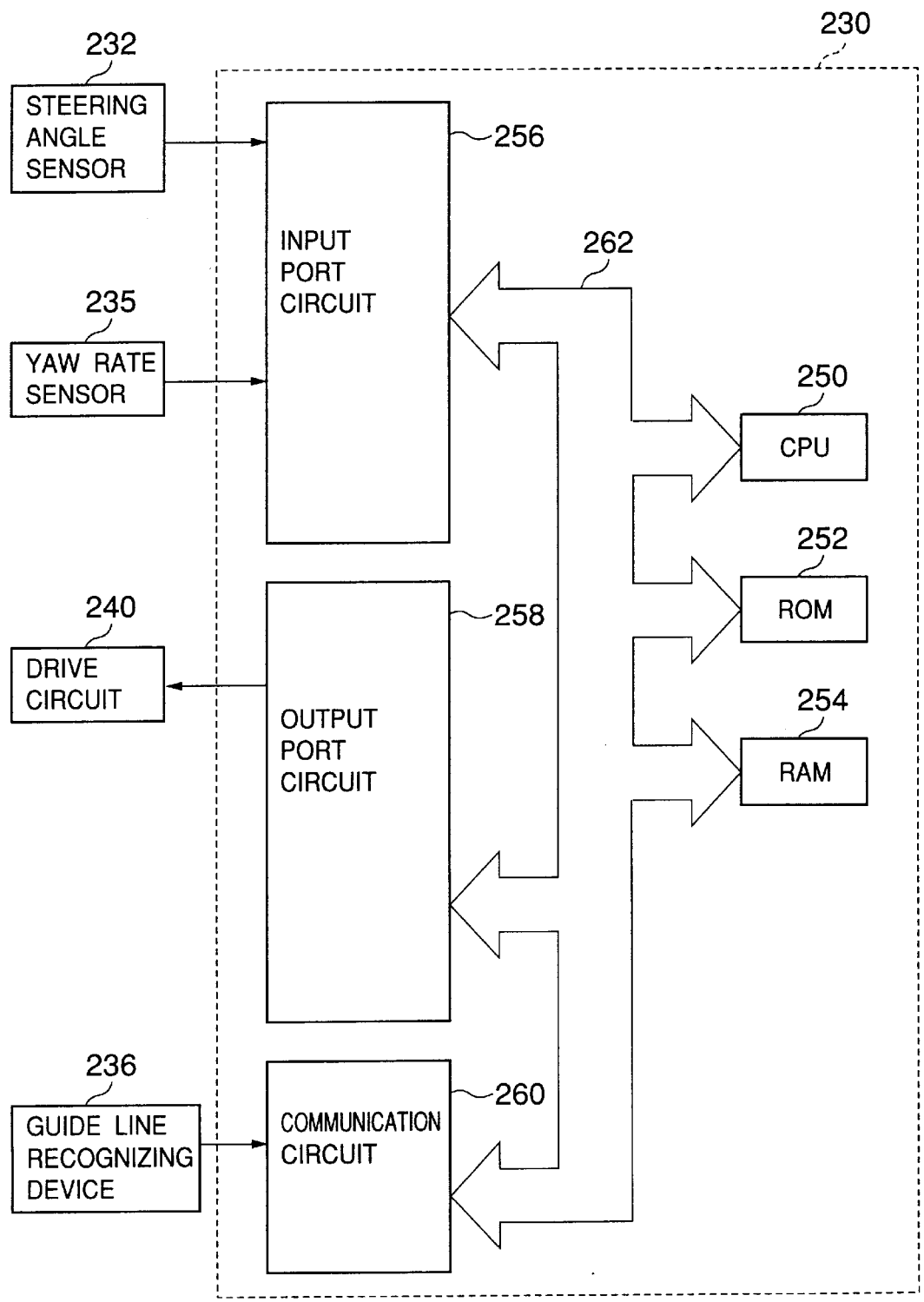
FIG. 23 is a block diagram of an ECU shown in FIG. 21.

FIG. 23 is a block diagram of the ECU 230. The ECU 230 has a microprocessor structure, and comprises a central processing unit (CPU) 250, a read-only memory (ROM) 252, a random access memory (RAM) 254, an input port circuit 256, an output port circuit 258 and a communication circuit 260, all of which are interconnected by a common bus 262.

The input port circuit 256 is provided with detection signals output from the steering angle sensor 232 and yaw rate sensor 235. Additionally, the detected values $\theta$, e, E(n) and R output from the guide line recognizing device 236 are supplied to the communication circuit 260.

The ROM 252 stores control programs. The CPU 250 performs various calculations in accordance with the control programs by using the RAM 254 which serves as a working area. Control signals are produced by calculations performed by the CPU 250, and the control signals are supplied to a drive circuit 240 via the output port circuit 258. The drive circuit 240 drives the electric motor 221 so as to steer the front wheels FW1 and FW2.

Figure 24:
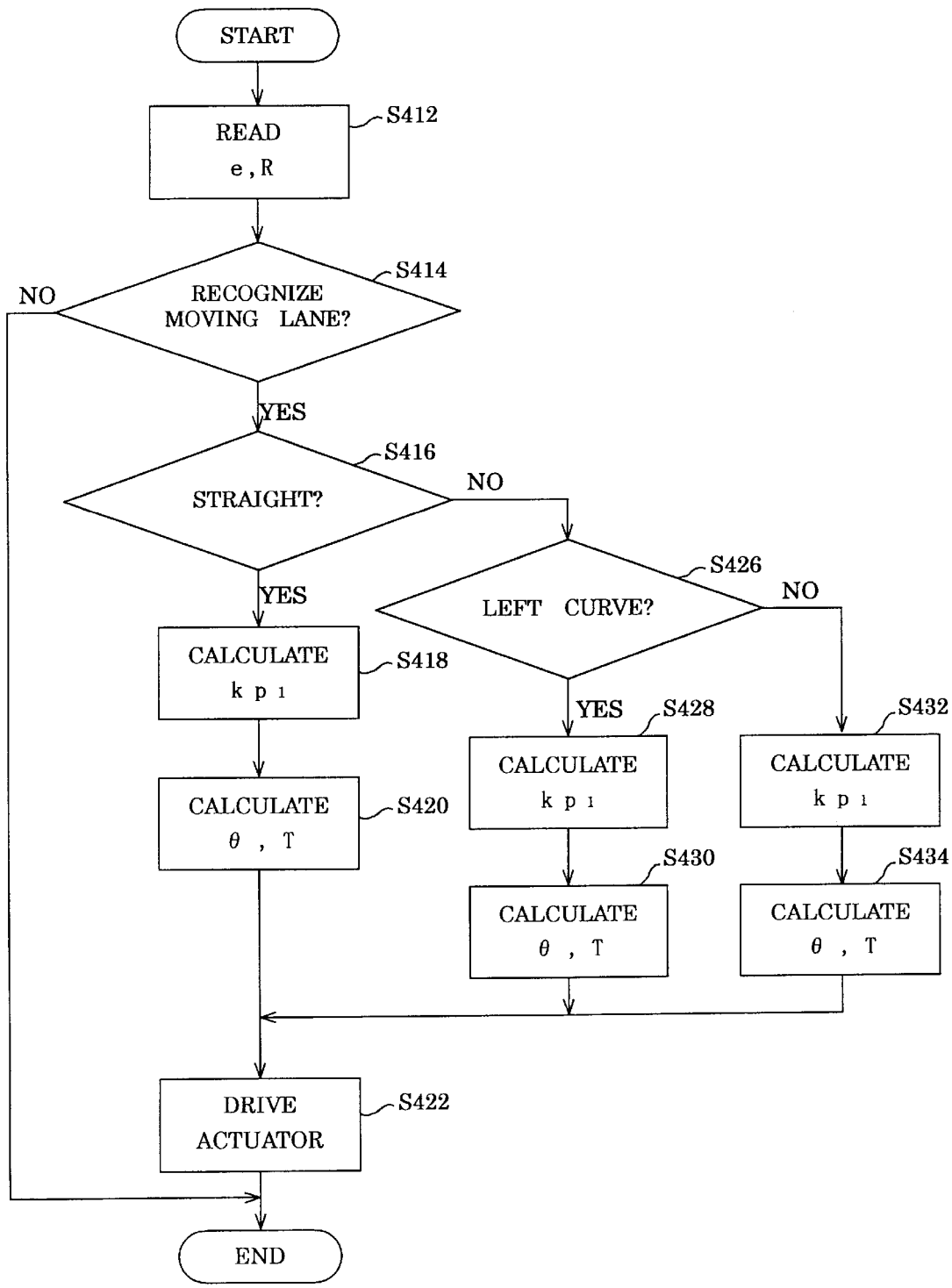
FIG. 24 is a flowchart of a steering control apparatus according to the eleventh embodiment of the present invention.

FIG. 24 is a flowchart of a steering control operation performed by the ECU 230. The above-mentioned steering control means M2 is achieved by this steering control operation, and is repeatedly performed at a predetermined time interval. When the steering control operation is started, the ECU 230 reads, in step S412, the offset amount E(n), the present transverse offset amount e and the radius R of the road output from the guide line recognizing device 236. Then, it is determined, in step S414, whether or not the guide line of the road was recognized. When the guide line can be recognized, the offset amount E(n) is within a predetermined range. On the other hand, when the guide line cannot be recognized, the offset amount E(n) is set to a specific value outside the predetermined range.

When the guide line is recognized, the routine proceeds to step S416. When the guide line is not recognized, the routine is ended. In step S416, it is determined whether or not the road on which the vehicle is moving is straight based on the radius R obtained from the guide line recognizing device 236. If it is determined that the road is straight, the routine proceeds to step S418 so as to obtain a position control gain kp1. The position control gain is obtained by referring to a map shown in FIG. 25 with respect to the present transverse offset amount e.

Then, in step S420, the steering control amount $\theta c$ and the steering torque T are obtained. The steering control amount $\theta c$ can be calculated by the following equation (3).

$$\theta c=(kp1\times e)+(kd\times de) \quad (3)$$

Figure 26:
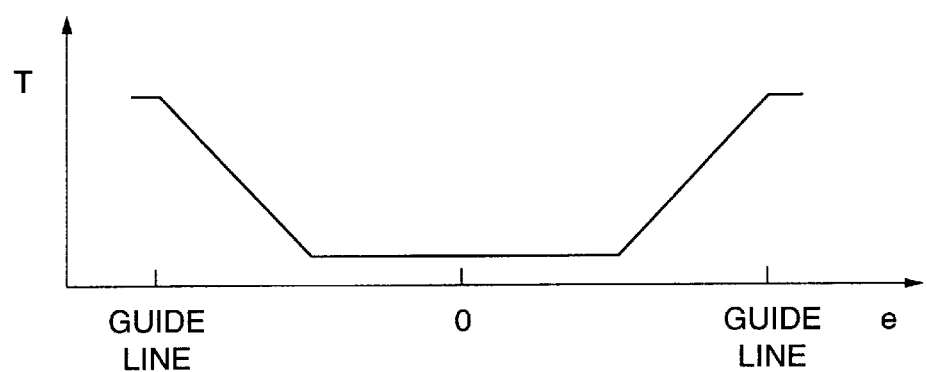
FIG. 26 is a graph indicating a map of a steering torque for a straight lane.

In the equation (3), kd is a predetermined factor (constant). Additionally, de is a differential value of the present transverse offset value e, that is, a difference between the present value of e and immediately preceding value of e. The steering torque T is obtained by referring to a map shown in FIG. 26 with respect to the present transverse offset value e. Thereafter, the routine proceeds to step S422.

On the other hand, if it is determined, in step S416, that the road is not straight, the routine proceeds to step S426 so as to determine whether or not the road is curved to the left or right. It should be noted that the radius R is a positive value when the road is curved to right, and is a negative value when the road is curved to left.

Figure 25:
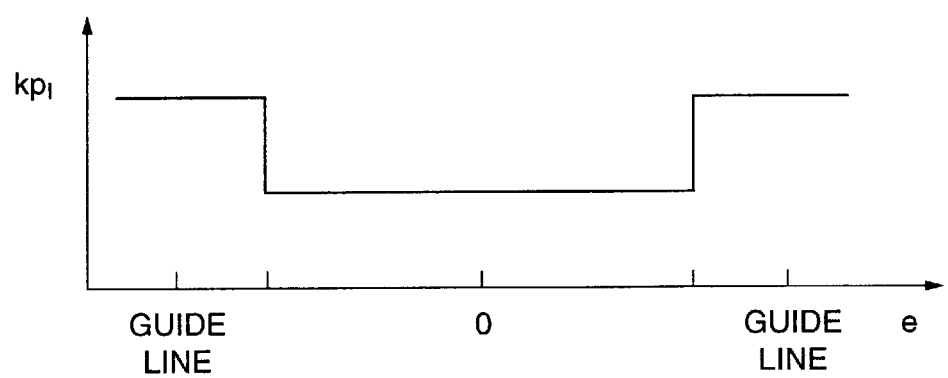
FIG. 25 is a graph indicating a map of a position control gain for a straight lane.
Figure 27:
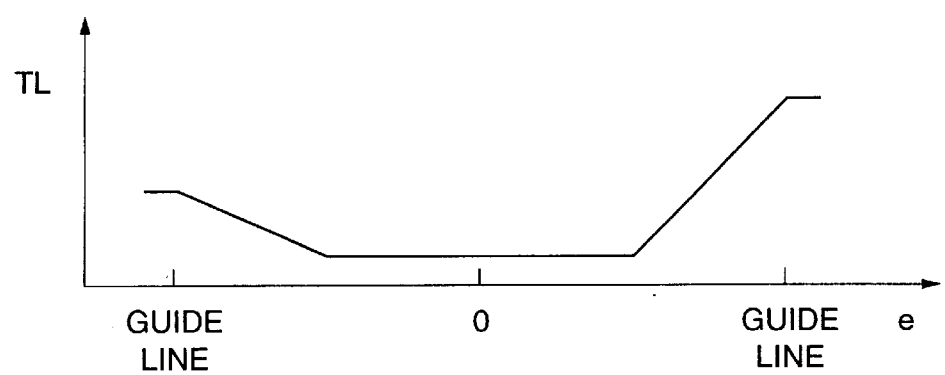
FIG. 27 is a graph indicating a map of a torque TL for a left curve.
Figure 28:
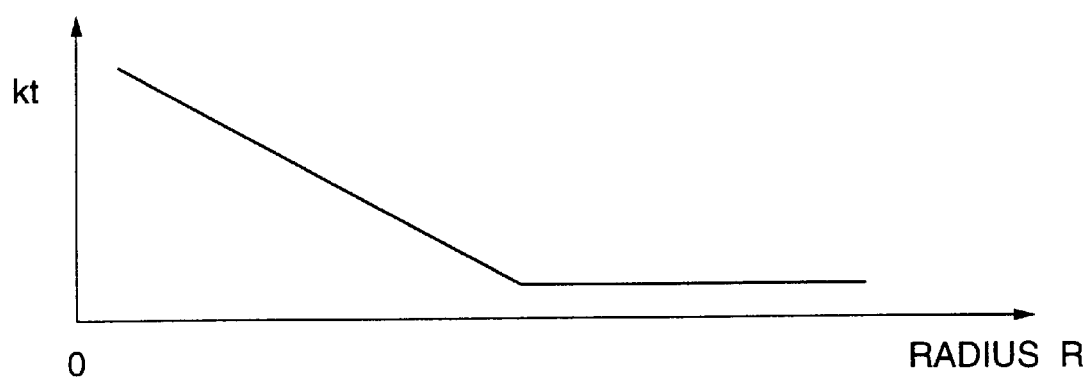
FIG. 28 is a graph indicating a map of a steering torque gain.

If it is determined that the road is curved to left, the routine proceeds to step S428 so as to obtain a position control gain kpi by referring to the map shown in FIG. 25 with the present transverse offset amount e. Thereafter, in step S430, the steering control amount $\theta c$ and the steering torque T are obtained. The steering control amount $\theta c$ is calculated by the above equation (3). The steering torque T is calculated by the following equation (4) after obtaining a torque TL and a steering torque gain kt. The torque TL is obtained by referring to a map shown in FIG. 27 with respect to the present transverse offset amount e. The steering torque gain is obtained by referring to a map shown in FIG. 28 with respect to the radius R.

$$T=TL\times kt \quad (4)$$

Thereafter the routine proceeds to step S422.

Figure 29:
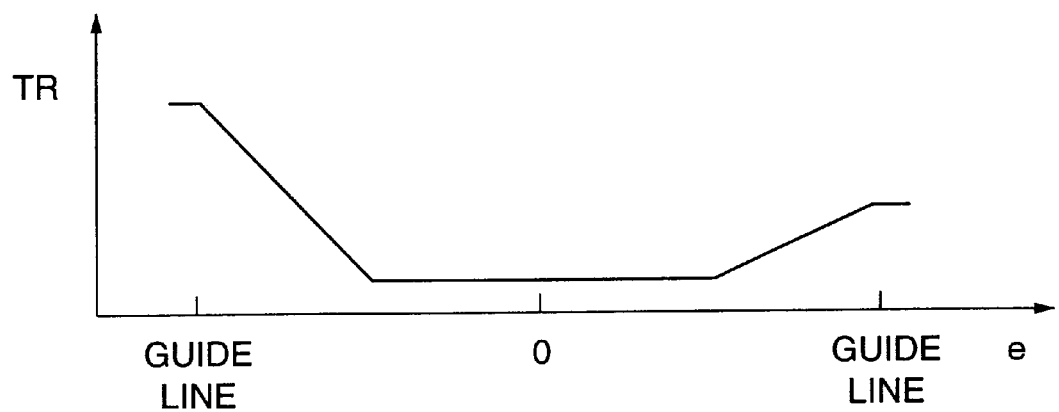
FIG. 29 is a graph showing a map of a torque TR for a right curve.

If it is determined that the road is curved to right, the routine proceeds to step S432 so as to obtain a position control gain kp1 by referring to the map shown in FIG. 25 with the present transverse offset amount e. Thereafter, in step S434, the steering control amount $\theta c$ and the steering torque T are obtained. The steering control amount $\theta c$ is calculated by the above equation (3). The steering torque T is calculated by the following equation (5) after obtaining a torque TR and a steering torque gain kt. The torque TR is obtained by referring to a map shown in FIG. 29 with respect to the present transverse offset amount e. The steering torque gain is obtained by referring to the map shown in FIG. 28 with respect to the radius R.

$$T=TR\times kt \quad (5)$$

Thereafter the routine proceeds to step S422.

In step S422, a signal based on the steering control amount and the steering torque T is output to the drive circuit 240. Accordingly, the electric motor 221 is driven so as to steer the front wheels FW1 and FW2, and the routine is ended. It should be noted that the process of steps S416 to S422 corresponds to the alarming torque providing means M4.

As mentioned above, when the vehicle on the road approaches the guide line, the torque provided to the steering means M3 is increased. The torque provided to the steering means M3 is transmitted to the driver of the vehicle, and thereby the driver can recognize a positional state of the vehicle with respect to the guide line.

Additionally, the attention of a driver strongly attracted when the vehicle is deviated outwardly in a curve by varying the torque in accordance with the radius R of the curve. That is, the torque is increased in an area adjacent to the guide line on an outer side of the curve.

Figure 30:
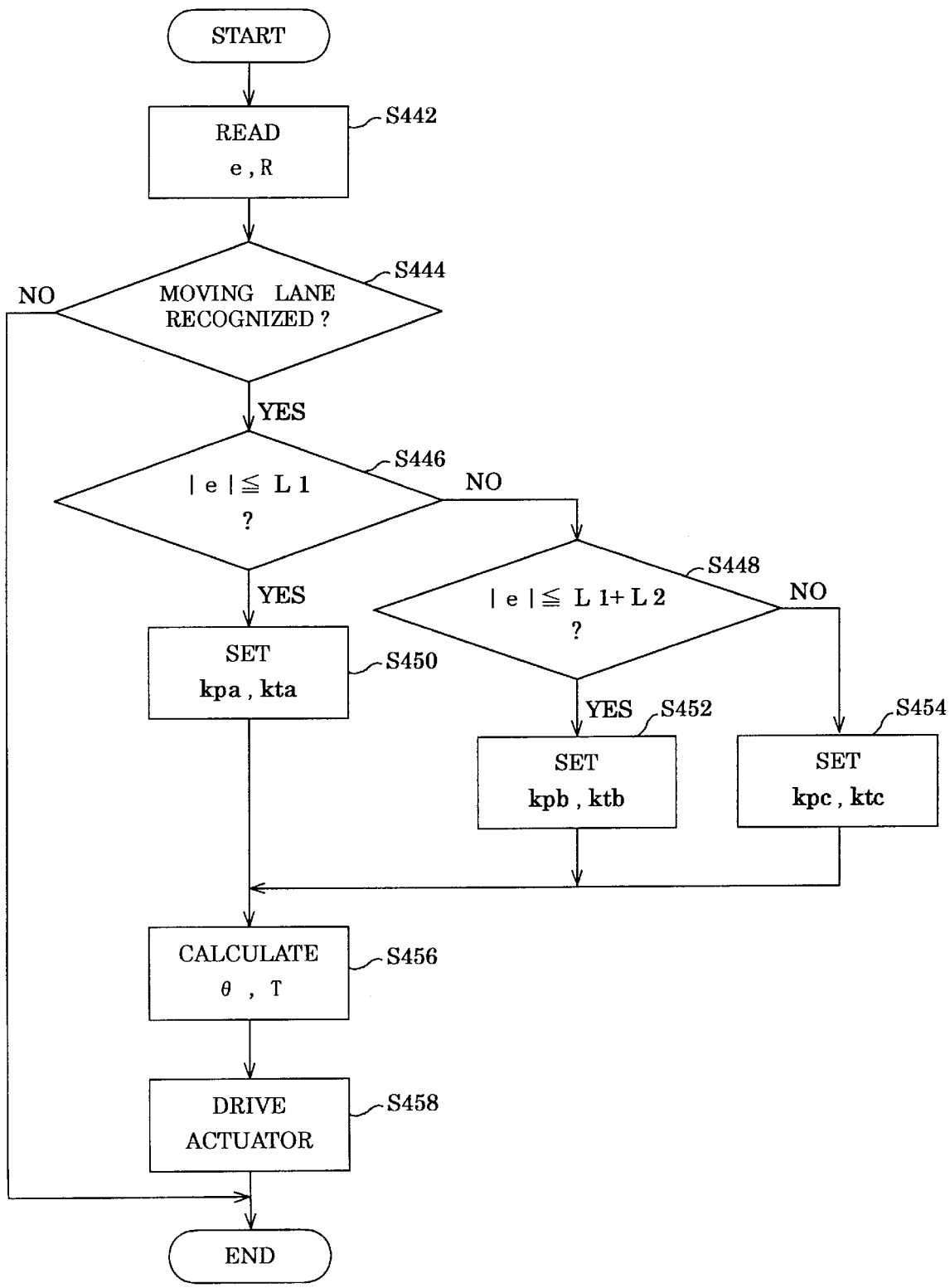
FIG. 30 is a flowchart of a steering control operation.

FIG. 30 is a flowchart of another steering control operation, as the steering control means M2, performed by the ECU 230. This steering control operation is repeatedly performed at a predetermined interval. In FIG. 30, the ECU 230 reads, in step S442, the offset amount E(n), the present transverse offset amount e and the radius R output from the guide line recognizing device 236. Then, in step S444, it is determined whether or not the guide line of the road can be recognized by the guide line recognizing device 236. If the guide line can be recognized, the offset amount E(n) is within a predetermined range. On the other hand, when the guide line cannot be recognized, the offset amount E(n) is set to a specific value outside the predetermined range.

Figure 31:
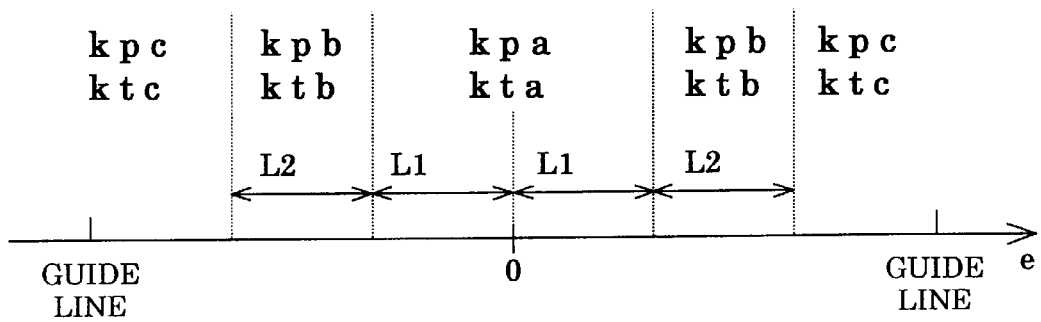
FIG. 31 is an illustration for explaining a relationship between a present transverse offset amount and a control gain.

If the guide line can be recognized, the routine proceeds to step S446. On the other hand, if the guide line cannot be recognized, the routine is ended. In steps S446 and S448, the present transverse offset amount e obtained from the guide line recognizing device 236 is compared with the predetermined values L1 and L2. As shown in FIG. 31, the predetermined value L1 is a value for determining whether or not the vehicle is located adjacent to the middle of the road. The predetermined value L1 is, for example, about a few tens of centimeters. The predetermined value L2 is a value for determining whether or not the vehicle is located adjacent to a guide line of the road. The predetermined value L2 is, for example, about one meter and a few tens of centimeters.

If it is determined, in step S446, that $|e| \leq L1$, the routine proceeds to step S450 to set kpa to the position control gain kp and set kta to the torque control gain kt. If it is determined, in step S446 and step S448, that $L1 \leq |e| \geq L1+L2$, the routine proceeds to step S452 so as to set kpb to the position control gain kp and set ktb to the torque control gain kt. On the other hand, if it is determined that $L1+L2<|e|$, the routine proceeds to step S454 so as to set kpc to the position control gain kp and set kt1 to the torque control gain kpc.

The above-mentioned values for position control gain kp and the torque control gain kt have the following relationships.

$$Kpb < kpa \leq kpc \quad (6)$$

$$0 \leq ktb < kta < ktc \quad (7)$$

As mentioned above, the control gains are set so that attention of the driver is attracted more strongly as the vehicle move closer to the guide line. It should be noted that the process of step S450 corresponds to a tracking torque providing means, and the process of step S454 corresponds to an alarming torque providing means.

After the process of one of steps S450, S452 and S454 are performed, the routine proceeds to step S456 so as to calculate the steering control amount θc and the steering torque T by the following equations (8) and (9).

$$\theta c = (kp \times e) + (kd \times de) \quad (8)$$

$$T = kt \times C \quad (9)$$

In the above, C is a predetermined value.

Thereafter the routine proceeds to step S458. In step S458, the drive circuit 240 is activated based on the steering control amount θc and the steering torque T. Thereby, the electric motor 221 is driven so as to operate the front wheels FW1 and FW2, and the routine is ended.

As mentioned above, when the vehicle is moving in the middle of the road or lane, a steering control (lane tracking) is performed so that the vehicle does not deviate from the middle of the road or lane. Thus, a stable movement of the vehicle is achieved. It should be noted that the steering operation of the vehicle is not performed by an automatic steering control but a manual control, and thereby the steering control operation by the steering control apparatus according to the present embodiment can be overcome by a steering effort performed by the driver.

It should be noted that the torque control gain kt can be varied in accordance with a steering angle and a steering angle velocity (or a yaw rate). That is, the value ktc for the torque control gain kt is increased when the steering angle and the steering angle velocity (differential value of the steering angle with respect to time) are smaller than the respective threshold values. On the other hand, the value ktc for the torque control gain kt is decreased when the steering angle and the steering angle velocity are greater than the respective threshold values.

Figure 32:
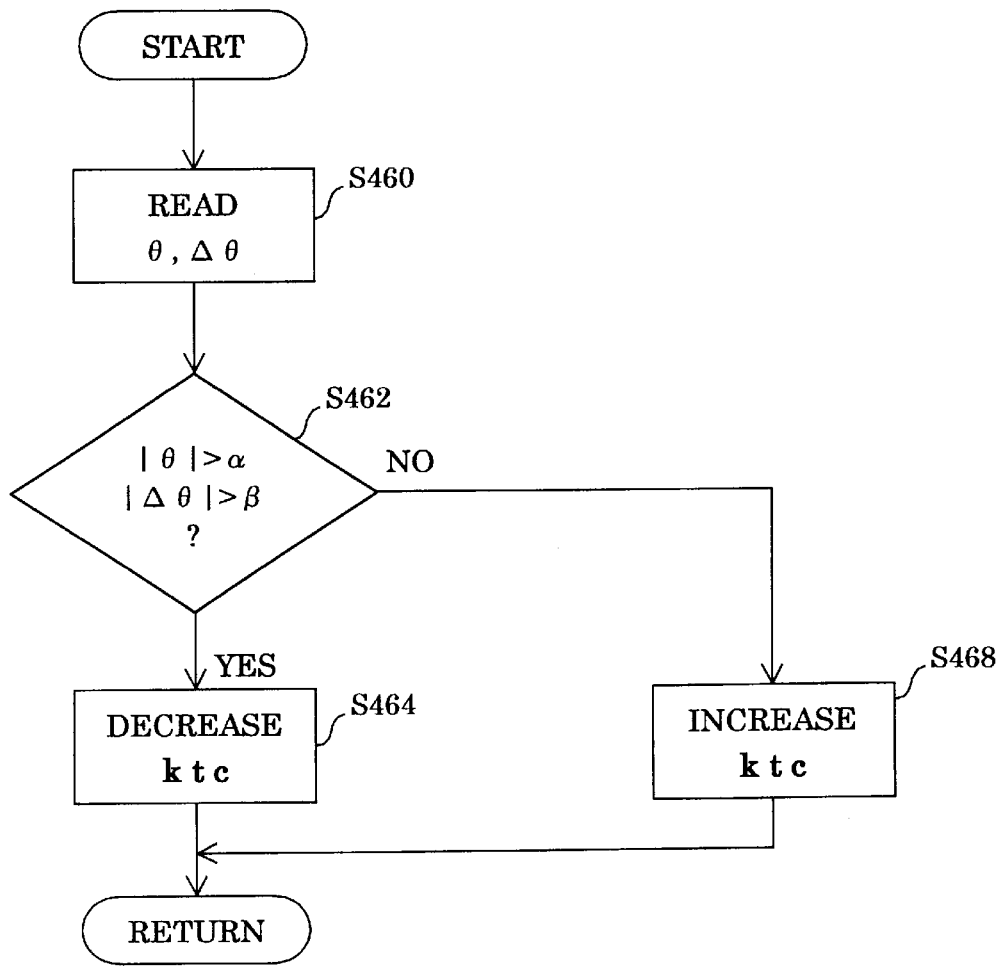
FIG. 32 is a flowchart of an interruption process.
Figure 33:
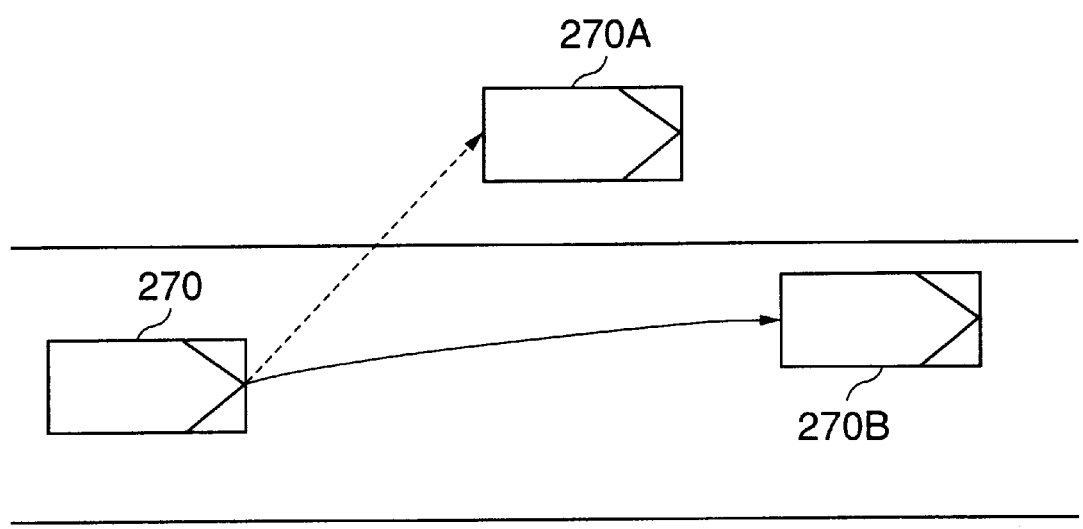
FIG. 33 is an illustration for explaining a movement of a vehicle provided with the steering control apparatus according to the eleventh embodiment of the present invention.

FIG. 32 is a flowchart for achieving the above-mentioned process. This process is interruptedly started at every predetermined time. In step S460, the steering angle θ and the steering angle velocity Δθ are read. Then, in step S462, it is determined whether or not the steering angle is greater than a threshold value α or whether or not the steering angle velocity Δθ is greater than a threshold value β. If θ>α or Δθ>β, the routine proceeds to step S464 so as to decrease the value ktc for the torque control gain kt. If θ≤α and Δθ≤β, the routine proceeds to step S466 so as to increase the value ktc for the torque control gain kt. Thereby, when the steering angle and the steering angle velocity of the vehicle 270 are large, a lane change can be easily performed so that the vehicle 270 can move to an adjacent lane as indicated by a dotted arrow and 270A in FIG. 33. On the other hand, if the steering angle and the steering angle velocity are small, the vehicle 270 can be maintained within the lane as indicated by 270B in FIG. 33.

Alternatively, the position control gain kp and the torque control gain may be varied in accordance with a position of the vehicle (the present transverse offset amount). That is, if the left turn steering operation is detected when the vehicle is moving on the left side of a road or lane, both the value kpc of the position control gain kp and the value ktc of the torque control gain kt are increased. Similarly, if the left turn steering operation is detected when the vehicle is moving on the right side of a road or lane, both the value kpc of the position control gain kp and the value ktc of the torque control gain kt are increased. It should be noted that a left turn steering can be recognized when a value obtained by subtracting the present steering angle from the immediately preceding steering angle is positive. On the other hand, a right turn steering can be recognized when a value obtained by subtracting the present steering angle from the immediately preceding steering angle is negative.

Figure 34:
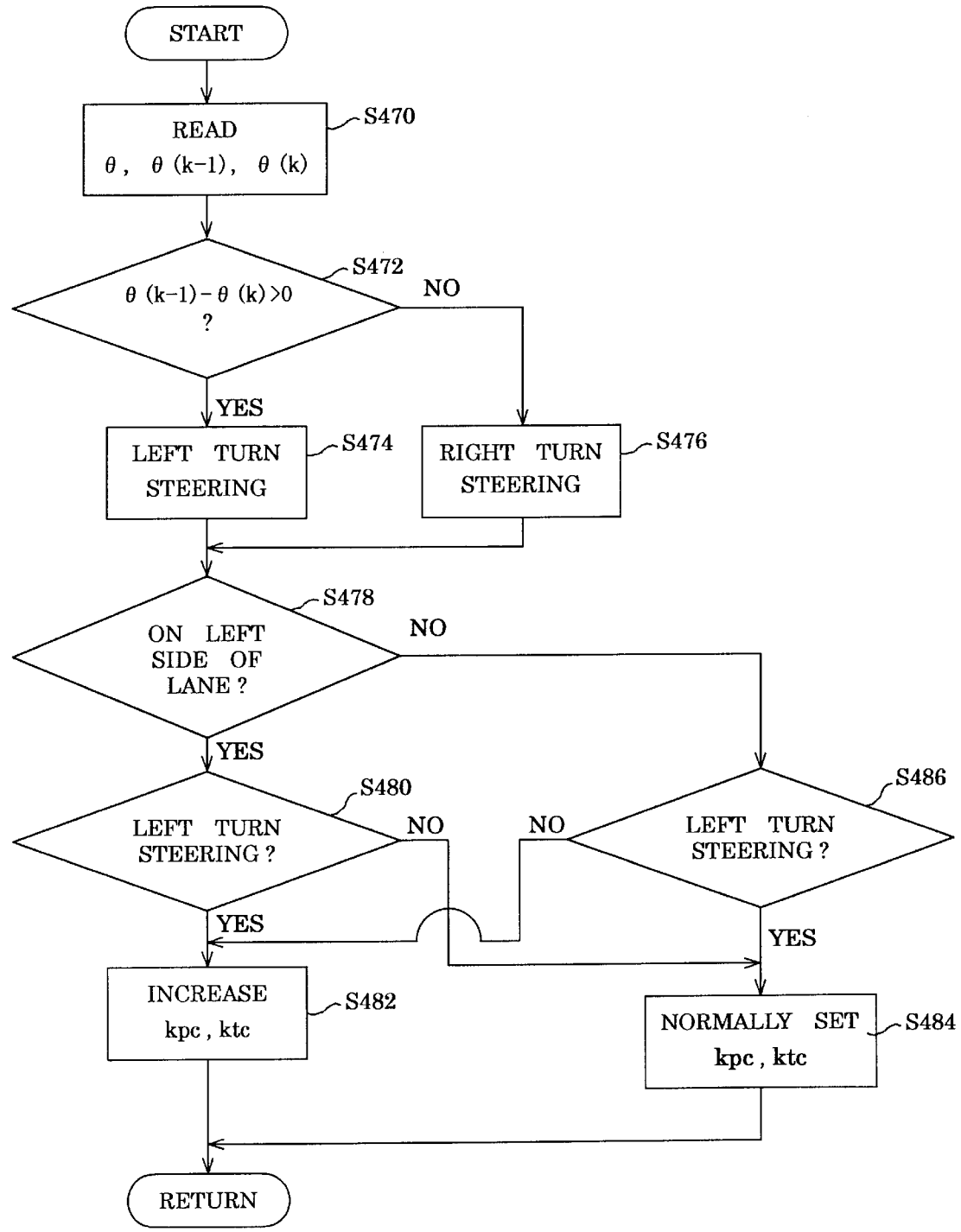
FIG. 34 is a flowchart of an interruption process of the steering control apparatus according to the present invention.

FIG. 34 is a flowchart for achieving the above-mentioned process. This process is interruptedly started every predetermined time. In step 470, the present transverse offset amount e, the immediately preceding steering angle θ(k−1) and the present steering angle θ(k) are read. In step S472, it is determined whether a left turn steering or a right turn steering is being performed by determining whether a difference θ(k−1)−θ(k) is positive or negative. If the difference is positive, the routine proceeds to step S474 in which the left turn steering is recognized. If the difference is negative, the routine proceeds to step S476 in which the right turn steering is recognized.

Thereafter, in step S478, whether or not the vehicle is moving on the left side of the road is obtained. If it is determined that the vehicle is moving on the left side, the routine proceeds to step S480. In step S480, it is determined whether or not the left turn steering is being performed. If it is determined that the left turn steering is being performed, the routine proceeds to step S482 so as to increase the value kpc for the position control gain kp and the value ktc of the torque control gain kt. On the other hand, if it is determined that the left turn steering is not being performed, that is, if the right turn steering is being performed, the routine proceeds to step S484 so as to set the normal value kpc to the position control gain kp and the normal value kpt to the torque control gain kp.

Figure 35:
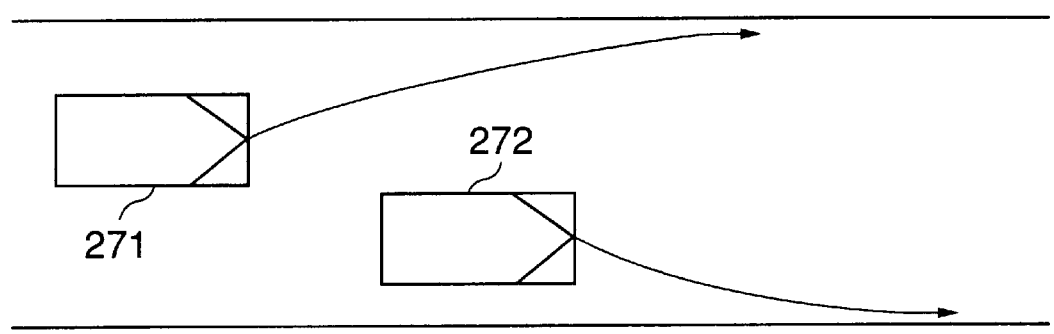
FIG. 35 is an illustration for explaining a movement of a vehicle provided with the steering control apparatus according to the eleventh embodiment of the present invention.

On the other hand, if it is determined, in step S478, that the vehicle is not moving on the left side, that is, if the vehicle is moving on the right side, the routine proceeds to step S486. In step S486, it is determined whether or not the left turn steering is being performed. If it is determined that the left turn steering is not being performed, that is, if the right turn steering is being performed, the routine proceeds to step S482 so as to increase the value kpc for the position control gain kp and the value ktc of the torque control gain kt. On the other hand, if it is determined that the left turn steering is being performed, the routine proceeds to step S484 so as to set the normal value kpc to the position control gain kp and the normal value kpt to the torque control gain kp. According to the above-mentioned process, vehicles 271 and 272 shown in FIG. 35 can be provided with a good capability to maintain moving within the current lane.

Figure 36:
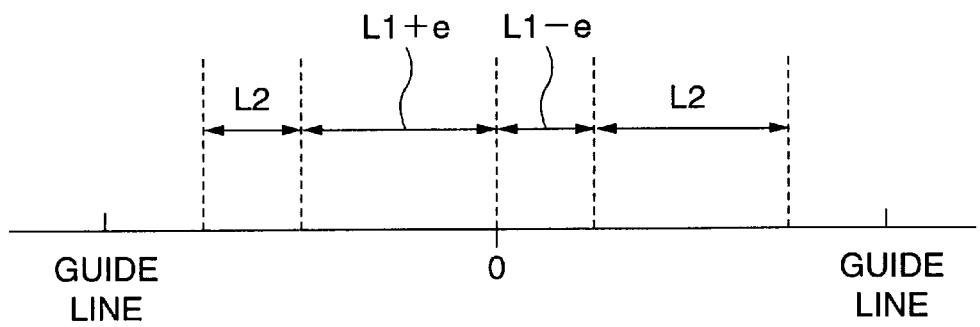
FIG. 36 is an illustration for explaining a change of a target position.

Additionally, if the vehicle is moving within a range L1+L2, and when an absolute value of the steering angle θ is smaller than a predetermined value θ0 for a predetermined period t0 (for example, a few tens of seconds), the predetermined value L1 may be shifted leftwardly or rightwardly by an average value of the present transverse offset values e so as to change a moving line of the vehicle from the middle of the lane to a presently moving position as shown in FIG. 36.

Figure 37:
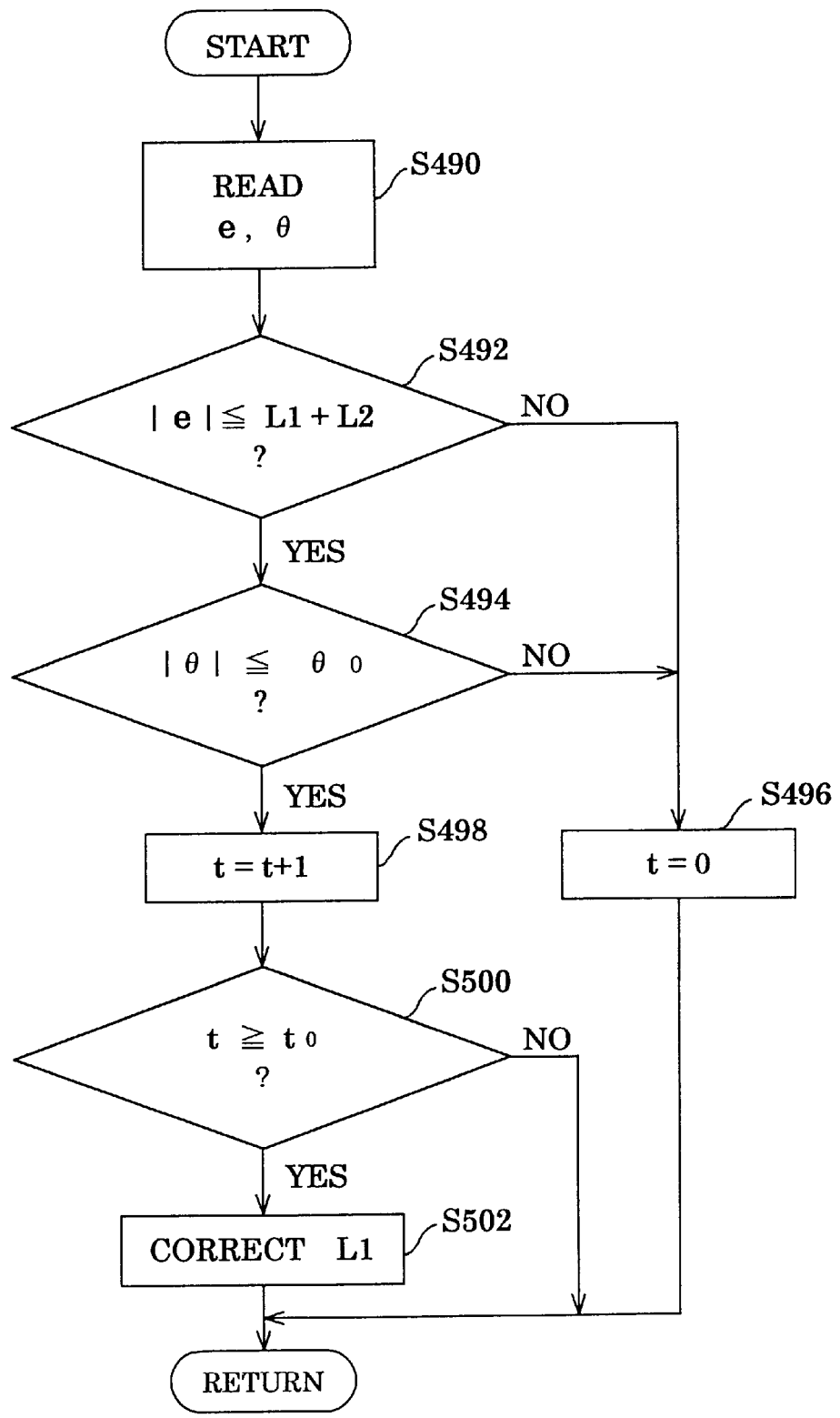
FIG. 37 is a flowchart of an interruption process of the steering control apparatus according to the present invention.

FIG. 37 is a flowchart for achieving the above-mentioned process. This process is interruptedly started at every predetermined time. In step S490, the present transverse offset amount e and the steering angle θ are read. Then, in step S492, it is determined whether or not an absolute value of the present transverse offset amount e is smaller that the predetermined value L1+L2. Additionally, it is determined, in step S494, whether or not an absolute value of the steering angle θ is smaller than the predetermined value θ0. If the condition of one of steps S492 and S494 is not satisfied, the routine proceeds to step S496 so as to set a timer t to "0". On the other hand, if the conditions of both steps S492 and S494 are satisfied, the routine proceeds to step S498 so as to count up the timer t. Then, in step S500, it is determined whether or not the timer t exceeds the predetermined value t0. If the timer t exceeds the predetermined value t0, the routine proceeds to step S502 so as to shift the predetermined value L1 leftwardly or rightwardly by the average value of the present transverse offset values e, and the routine is ended. If it is determined that the timer does not exceed the predetermined value t0, the routine is ended.

The present invention is not limited to the specifically disclosed embodiments, and variations and modifications may be made without departing from the scope of the present invention.

The present application is based on Japanese priority applications No. 9-183965, No. 9-257060 and No. 9-270173, the contents of which are hereby incorporated by reference.

What is claimed is:

1. A vehicle steering control apparatus for recognizing a lane on which a vehicle is moving and controlling a steering torque of the vehicle so that the vehicle moves along the lane the vehicle steering apparatus comprising:

reference line setting means for setting a plurality of reference lines which extend along the lane and are arranged parallel to each other in a direction of a width of the lane;

target moving line selecting means for selecting a target moving line from among the plurality of reference lines in accordance with a state of movement of the vehicle; and returning steering torque generating means for generating a steering torque for shifting a moving line of the vehicle toward the target moving line, wherein said target moving line selecting means selects one of the reference lines which approximates a steering operation line achieved by a steering effort performed by a driver of the vehicle as the target moving line.

2. A vehicle steering control apparatus for recognizing a lane on which a vehicle is moving and controlling a steering torque of the vehicle so that the vehicle moves along the lane, the vehicle steering control apparatus comprising:

reference line setting means for setting a plurality of reference lines which extend along the lane and are arranged parallel to each other in a direction of a width of the lane;

target moving line selecting means for selecting a target moving line from among the plurality of reference lines in accordance with a state of movement of the vehicle; and returning steering torque generating means for generating a steering torque for shifting a moving line of the vehicle toward the target moving line, deviation preventing area setting means for setting a deviation preventing area on a side of the lane; and deviation preventing torque generating means for generating a steering torque for moving the vehicle toward a middle of the lane when the moving line of the vehicle overlaps with the deviation preventing area.

3. The vehicle steering control apparatus claimed in claim 2, further comprising:

circumstances recognizing means for recognizing circumstances of a moving path of said vehicle; and control gain changing means for changing a magnitude of the steering torque generated by said deviation preventing torque generating means in accordance with the circumstances of the moving path.

4. The vehicle steering control apparatus as claimed in claim 2, further comprising:

circumstances recognizing means for recognizing circumstances of a moving path of said vehicle, wherein said deviation preventing area setting means includes area width setting means for setting a width of said deviation preventing area in accordance with the circumstances of the moving path.

5. The vehicle steering control apparatus as claimed in claim 4, further comprising:

steering operation line learning means for learning a steering operation line with respect to each circumstance of the moving path, the steering operation line being achieved by a steering effort performed by a driver of said vehicle, wherein said area width setting means includes learning result reflecting means for reflecting a result of learning of said steering operation line learning means in the width of said deviation preventing area.

* * * * *

UNITED STATES PATENT AND TRADEMARK OFFICE
CERTIFICATE OF CORRECTION

PATENT NO.: 6,185,492 B1

DATED: February 6, 2001

INVENTOR(S): Kazunori KAGAWA et al.

It is certified that an error appears in the above-identified patent and that said Letters Patent is hereby corrected as shown below:

Title page, col. 1, line 1, under "Foreign Application Priority Data", "9-183956" should be -9-183965-.

Signed and Sealed this

Twenty-ninth Day of May, 2001

Attest:

NICHOLAS P. GODICI

*Attesting Officer*      *Acting Director of the United States Patent and Trademark Office*